(12) United States Patent
Tzur-David et al.

(10) Patent No.: US 11,271,926 B2
(45) Date of Patent: *Mar. 8, 2022

(54) SYSTEM AND METHOD FOR TEMPORARY PASSWORD MANAGEMENT

(71) Applicant: SECRET DOUBLE OCTOPUS LTD, Tel-Aviv (IL)

(72) Inventors: Shimrit Tzur-David, Mevaseret Zion (IL); Chen Tetelman, Tel Aviv (IL); Amit Rahav, Tel-Aviv (IL)

(73) Assignee: SECRET DOUBLE OCTOPUS LTD, Tel-Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/802,907

(22) Filed: Feb. 27, 2020

(65) Prior Publication Data
US 2020/0195635 A1 Jun. 18, 2020

Related U.S. Application Data

(63) Continuation of application No. 15/660,278, filed on Jul. 26, 2017, now Pat. No. 10,601,814.

(51) Int. Cl.
*H04L 29/06* (2006.01)
*G06F 17/11* (2006.01)
(Continued)

(52) U.S. Cl.
CPC .......... *H04L 63/0838* (2013.01); *G06F 17/11* (2013.01); *G06F 21/31* (2013.01);
(Continued)

(58) Field of Classification Search
CPC .......... G06F 17/11; G06F 21/31; G06F 21/42; G06F 21/45; G06F 2221/2137;
(Continued)

(56) References Cited

U.S. PATENT DOCUMENTS 8,201,217 B1 6/2012 Begen
8,528,062 B1 9/2013 Connor
(Continued)

OTHER PUBLICATIONS

Office Action for U.S. Appl. No. 15/936,578, dated Jan. 17, 2020.
(Continued)

*Primary Examiner* — Darren B Schwartz
*Assistant Examiner* — Ka Shan Choy
(74) *Attorney, Agent, or Firm* — Pearl Cohen Zedek Latzer Baratz LLP

(57) ABSTRACT

A system and method for of temporary password management may include: obtaining, by a password management entity, a request to login a local device into an authentication authority; generating, by the password management entity, a temporary password; sending, by the password management entity, the temporary password to the authentication authority; sending, by the password management entity, the temporary password to a user device; obtaining, at the authentication authority the temporary password from the local device; comparing, by the authentication authority, the temporary password obtained from the local device with the temporary password obtained from the password management entity; and authorizing the login if a match is found.

19 Claims, 11 Drawing Sheets

(51) Int. Cl.
G06F 21/31 (2013.01)
G06F 21/42 (2013.01)
G06F 21/45 (2013.01)

(52) U.S. Cl.
CPC .............. *G06F 21/42* (2013.01); *G06F 21/45* (2013.01); *H04L 63/0846* (2013.01); *H04L 63/10* (2013.01); *H04L 63/18* (2013.01); *H04L 63/20* (2013.01); *G06F 2221/2137* (2013.01)

(58) Field of Classification Search
CPC . H04L 63/0838; H04L 63/0846; H04L 63/10; H04L 63/18; H04L 63/20
See application file for complete search history.

(56) References Cited

U.S. PATENT DOCUMENTS

| | | | |
|---|---|---|---|
| 2005/0015604 A1* | 1/2005 | Sundararajan | G06F 21/36 713/184 |
| 2006/0156385 A1* | 7/2006 | Chiviendacz | H04L 9/3271 726/2 |
| 2008/0071674 A1 | 3/2008 | Thackston | |
| 2008/0134286 A1 | 6/2008 | Amdur et al. | |
| 2013/0159195 A1* | 6/2013 | Kirillin | G06Q 20/322 705/71 |
| 2014/0075525 A1* | 3/2014 | Ferlin | H04M 3/42059 726/6 |
| 2014/0157392 A1* | 6/2014 | Smith | H04L 63/10 726/9 |
| 2015/0237038 A1 | 8/2015 | Grajek et al. | |
| 2017/0109751 A1 | 4/2017 | Dunkelberger et al. | |
| 2018/0063131 A1* | 3/2018 | Revell | H04L 9/3273 |
| 2019/0020646 A1* | 1/2019 | Magyar | G06F 21/41 |
| 2019/0026456 A1* | 1/2019 | Hon | H04L 63/102 |

OTHER PUBLICATIONS

Notice of Allowance for U.S. Appl. No. 15/936,578, dated May 28, 2020.

* cited by examiner

SYSTEM AND METHOD FOR TEMPORARY PASSWORD MANAGEMENT

CROSS REFERENCE TO RELATED APPLICATIONS

This application is a continuation of U.S. patent application Ser. No. 15/660,278, filed Jul. 26, 2017, which is incorporated herein by reference in its entirety.

FIELD OF THE INVENTION

The present invention relates generally to security and authentication. More specifically, the present invention relates to temporary password management.

BACKGROUND OF THE INVENTION

Protecting and securing information communicated between computing devices is a requirement that is well acknowledged by the computing industry. As known in the art, an attacker that gains access to sensitive or personal data may cause extreme damage. The need to authenticate devices is critical in enforcing security of information.

Known systems and methods use encryption to secure and protect communicated data and credentials (e.g., user name and password) to authenticate devices or users. However, known systems and methods suffer from a few drawbacks. For example, some systems and methods use a certificate authority that, if hacked, may fail to provide security. Other examples may be a hacker who obtains credentials such as user name and password and can use the credentials to authenticate himself to a computer, device or system, an eavesdropper who manages to obtain an encryption key and can decrypt encrypted data, and an adversary or malicious entity who manages to capture one or more decrypted messages and may decipher the encrypted messages.

For example, some known systems and methods use a public key infrastructure (PKI) that includes a set of rules and procedures used to create and distribute digital certificates that are used to authenticate, or confirm identities of, parties involved in a communication. Specifically, a registration authority (RA) accepts requests for digital certificates and authenticates entities.

Accordingly, PKI based systems and methods do not scale easily since the load on an RA increases as the number of devices in a system grows. For example, known systems and methods are unable to meet challenges introduced by the introduction of Internet of Things (IoT) devices and systems where extremely large numbers of devices need to be authenticated.

Yet another drawback is the fact that, if a key issued by an RA to sign certificates is stolen or otherwise obtained by a hacker, then all certificates of the RA are immediately rendered useless. Further aggravating the problem associated with known systems and methods is the fact that an RA is a single point of failure.

SUMMARY OF THE INVENTION

According to some embodiments of the present invention, there is provided a system and method of revoking a computerized account of a first entity. Some embodiments of the invention may include: obtaining, by an identifying entity, a request to revoke the computerized account of the first entity; sending a first value to the first entity; sending a second value to a second entity that is associated with the first entity; receiving, by the identifying entity from one of the first entity and the second entity, a third value based on the first and second values; and revoking the computerized account based on the third value.

Furthermore, some embodiments of the invention may include sending the first value to the first entity over a first secured communication channel; sending the second value to the second entity over a second secured communication channel; and using one of the first entity and the second entity to provide one of the first value and the second value to the other entity.

Furthermore, some embodiments of the invention may include sending the first value to the first entity over an in-band channel; sending the second value to the second entity over an in-band channel; and providing the first value by one of the first entity and the second entity to the other entity over an out-of-band channel.

Furthermore, some embodiments of the invention may include authenticating the first entity, by the identifying entity based on determination that one of the first entity and the second entity possesses the first and second values.

Furthermore, some embodiments of the invention may include encrypting the first and second values.

Furthermore, according to some embodiments of the invention, the first value may include a first pair of input and output values of a polynomial of a first degree and the second value may include a second pair of input and output values of the polynomial. Some embodiments of the invention may include using the first and second pairs to identify the polynomial; and generating the third value based on a function applied to at least one coefficient of the polynomial.

Furthermore, some embodiments of the invention may include generating a set of at least K+1 pairs of input and output values of a polynomial of degree K; sharing the at least K+1 pairs over at least two different network routes with the first entity and the second entity, such that no single entity on a network obtains more than K pairs included in the set of at least K+1 pairs, wherein the first value includes a portion of pairs of input and output values of a polynomial, and wherein the second value includes the other pairs of input and output values of a polynomial; and after constructing the polynomial from the at least K+1 pairs, applying a function to at least one of the coefficients of the polynomial to generate the third value.

Furthermore, some embodiments of the invention may include using the first and second values, by one of the first entity and the second entity, to generate the third value; and sending, by one of the first entity and the second entity, the third value to the identifying entity.

Furthermore, some embodiments of the invention may include maintaining a database of associations between entities.

According to some embodiments of the present invention, there is provided a system and method of password management. Some embodiments of the invention may include: obtaining, by a password management entity, a request to log a local device into an authentication authority; generating, by the password management entity, a temporary password; sending, by the password management entity, the temporary password to the authentication authority; sending, by the password management entity, the temporary password to a user device; obtaining, at the authentication authority the temporary password from the local device; comparing, by the authentication authority, the temporary password obtained from the local device with the temporary password obtained from the password management entity; and authorizing the login if a match is found.

Furthermore, some embodiments of the invention may include generating two values, $TP_1$ and $TP_2$, based on the temporary password, wherein the temporary password can be determined based on the values $TP_1$ and $TP_2$.

Furthermore, some embodiments of the invention may include sending, by the password management entity, $TP_1$ to the user device over a first secured communication channel; and sending, by the password management entity, $TP_2$ to the user device over a second secured communication channel.

Furthermore, some embodiments of the invention may include combining $TP_1$ and $TP_2$ by the user device to arrive at the temporary password; and sending the temporary password from the user device to the local device using an out-of-band channel.

Furthermore, some embodiments of the invention may include sending, by the password management entity, $TP_1$ to the user device over a first secured communication channel; sending, by the password management entity, $TP_2$ to the local device over a second secured communication channel; sending the $TP_1$ from the user device to the local device using out-of-band channel; and combining $TP_1$ and $TP_2$ by the local device to arrive at the temporary password.

Furthermore, some embodiments of the invention may include sending, by the password management entity, $TP_1$ to authentication authority over a first secured communication channel; sending, by password management entity, $TP_2$ to the authentication authority over a second secured communication channel; and combining $TP_1$ and $TP_2$ by the authentication authority to arrive at the temporary password.

Furthermore, some embodiments of the invention may include deleting the temporary password from the authentication authority after comparing.

Furthermore, according to some embodiments of the invention, $TP_1$ includes a first pair of input and output values of a polynomial of a first degree and the $TP_2$ includes a second pair of input and output values of the polynomial, and some embodiments of the invention may include: using the first and second pairs to identify the polynomial; and generating the temporary password based on a function applied to at least one coefficient of the polynomial.

Furthermore, some embodiments of the invention may include generating a set of at least K+1 pairs of input and output values of a polynomial of degree K, wherein $TP_1$ includes a portion of pairs of input and output values of the polynomial, and wherein the $TP_2$ includes the other pairs of input and output values of the polynomial; using $TP_1$ and $TP_2$ to identify the polynomial; and, after identifying the polynomial from the at least K+1 pairs, applying a function to at least one of the coefficients of the polynomial to generate the temporary password.

Furthermore, some embodiments of the invention may include storing the temporary password on the local device.

BRIEF DESCRIPTION OF THE DRAWINGS

Non-limiting examples of some embodiments of the invention are described below with reference to figures attached hereto that are listed following this paragraph. Identical features that appear in more than one figure are generally labeled with a same label in all the figures in which they appear. A label labeling an icon representing a given feature of an embodiment of the invention in a figure may be used to reference the given feature. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Some embodiments of the invention are illustrated by way of example and not limitation in the figures of the accompanying drawings, in which like reference numerals indicate corresponding, analogous or similar elements, and in which:

Figure 1:
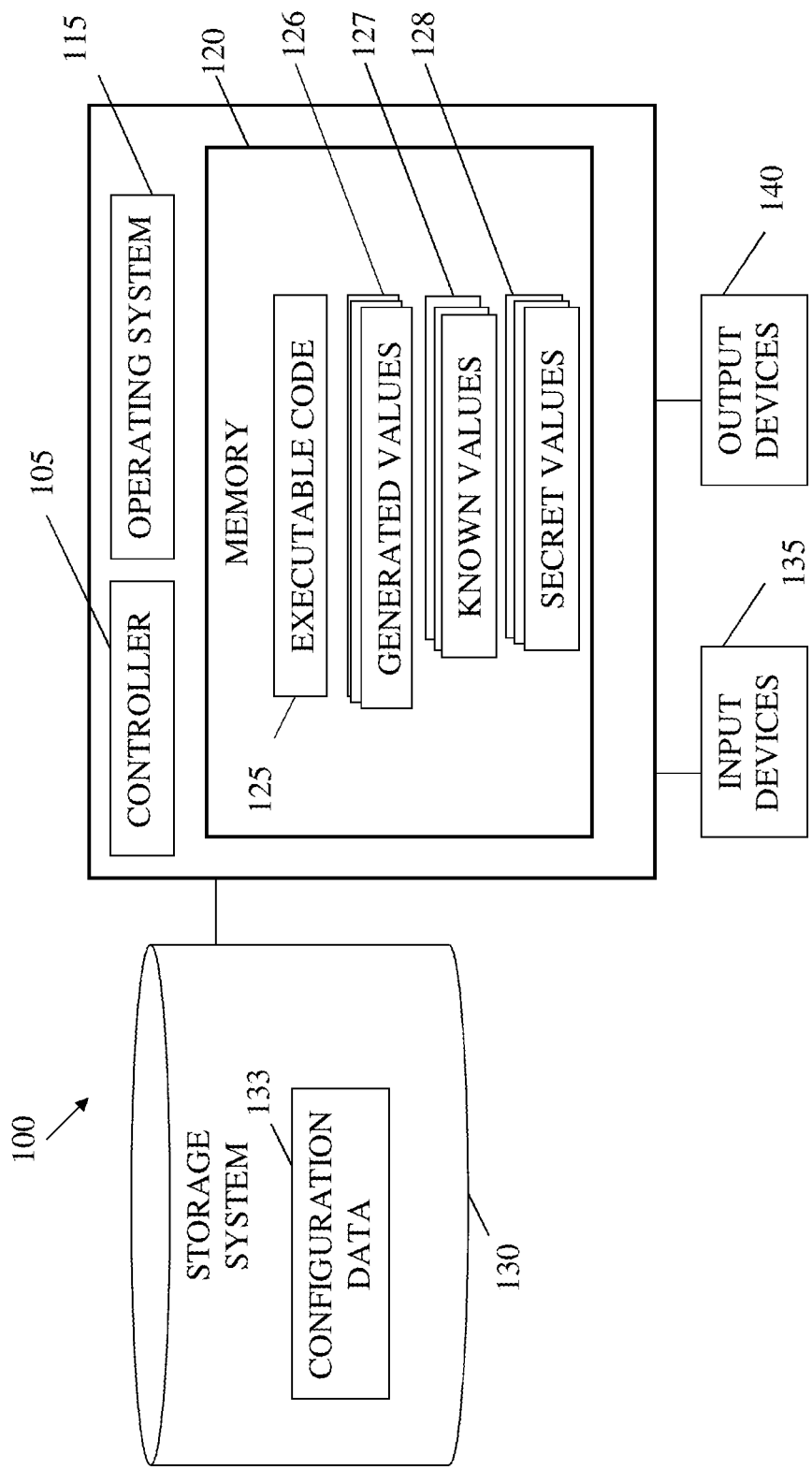
FIG. 1 shows high-level block diagram of a computing device according to illustrative embodiments of the present invention.

It will be appreciated that, for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic)

quantities within the computer's registers and/or memories into other data similarly represented as physical quantities within the computer's registers and/or memories or other information non-transitory storage medium that may store instructions to perform operations and/or processes. Although some embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1, showing a high-level block diagram of a system or computing device according to some embodiments of the present invention. Computing device 100 may include a controller 105 that may be, for example, a central processing unit processor (CPU), a chip or any suitable computing or computational device, an operating system 115, a memory 120 that may include executable code 125, generated values 126, known values 127 and secret values 128. As shown, computing device 100 may include or be operatively connected to storage system 130, input devices 135 and output devices 140. As shown, storage system 130 may include configuration data 133.

Controller 105 (or one or more controllers or processors, possibly across multiple units or devices) may be configured to carry out methods described herein, and/or to execute or act as the various modules, units, etc. More than one computing device 100 may be included in, and one or more computing devices 100 may be, or act as the components of, a system according to some embodiments of the invention. Controller 105 may be or may include a microprocessor, a microcontroller, a digital signal processor (DSP), a field programmable gate array (FPGA), an integrated circuit (IC), an application specific integrated circuit (ASIC), a programmable logic device (PLD), a state machine, gated logic, discrete hardware components, dedicated hardware finite state machines, or any other suitable hardware.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system, e.g., Windows, Linux, Android and the like.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Each of generated values 126, known values 127 and secret values 128 may be, or may include, a number, a value, a code, a set of numbers or values, a string (e.g., one or more characters, for example, represented using their respective American Standard Code for Information Interchange (ASCII) code or value) or any digital object that includes or represents a value, e.g., an object or memory segment the size of 32, 64 or 128 bits. Known values 127 may be, or may be calculated based on, a value that is known to, or included in, a device, e.g., a serial number embedded in a ROM and printed on the back of a network hub, a value entered by a user, etc.

Any number of known values 127 may be included in a device, module or unit (e.g., in a security enforcement unit as described herein). For example, several known values 127 such as a serial number, the manufacture date and time and/or identification (ID) code of an appliance may be known to, or included in, an appliance (e.g., stored in ROM) and known to, or included in, a user's smartphone (e.g., entered by the user).

Generated values 126 may be, or may include, a value generated and stored, in a device, by a user and/or manufacturer or it may be randomly generated by a device as described herein, e.g., generated values 126 may be randomly selected and/or generated by computing device 100 or it may be randomly selected and/or generated by a remote device and provided to computing device 100. Any number of generated values 126 may be (and typically are) included in a device, module or unit (e.g., in a security enforcement unit as described herein).

For example, one or more generated values 126 may be generated for each new communication channel, or session, between computing device 100 and a remote device or one or more generated values 126 may be generated once per device, e.g., upon a first or initial communication with a remote device and/or during a process of authenticating a remote device. Secret values 128 may be calculated, defined and/or determined based on one or more generated values 126 and/or one or more known values 127.

Randomly generating a value or number as referred to herein may be, or may include, generating a value or number that cannot be reasonably predicted, e.g., as done for lottery games or by a random-number generator (RNG) as known in the art.

Generated values 126, known values 127 and secret values 128 may be complex values, numbers, codes or objects, for example generated values 126 and/or known values 127 may be, may represent or may include, a pair of values that represent a point $(x_i, y_i)$ on a polynomial p(x). For example, using predefined logic or function, a value in a barcode may be used to calculate a set of $(x_i, y_i)$ values or points and the set may be stored in one or more of known values 127.

Executable code 125 may be any executable code, e.g., an application, a program, a process, task or script. Executable code 125 may be executed by controller 105 possibly under control of operating system 115. For example, executable code 125 may be an application that secures a communication channel and/or authenticates a remote device as further described herein. Embedded in memory 120, executable code 125 may be firmware as known in the art.

Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein. For example, units or modules described herein (e.g., security enforcement unit 211 described herein) may be, or may include, controller 105, memory 120 and executable code 125.

Figure 2:
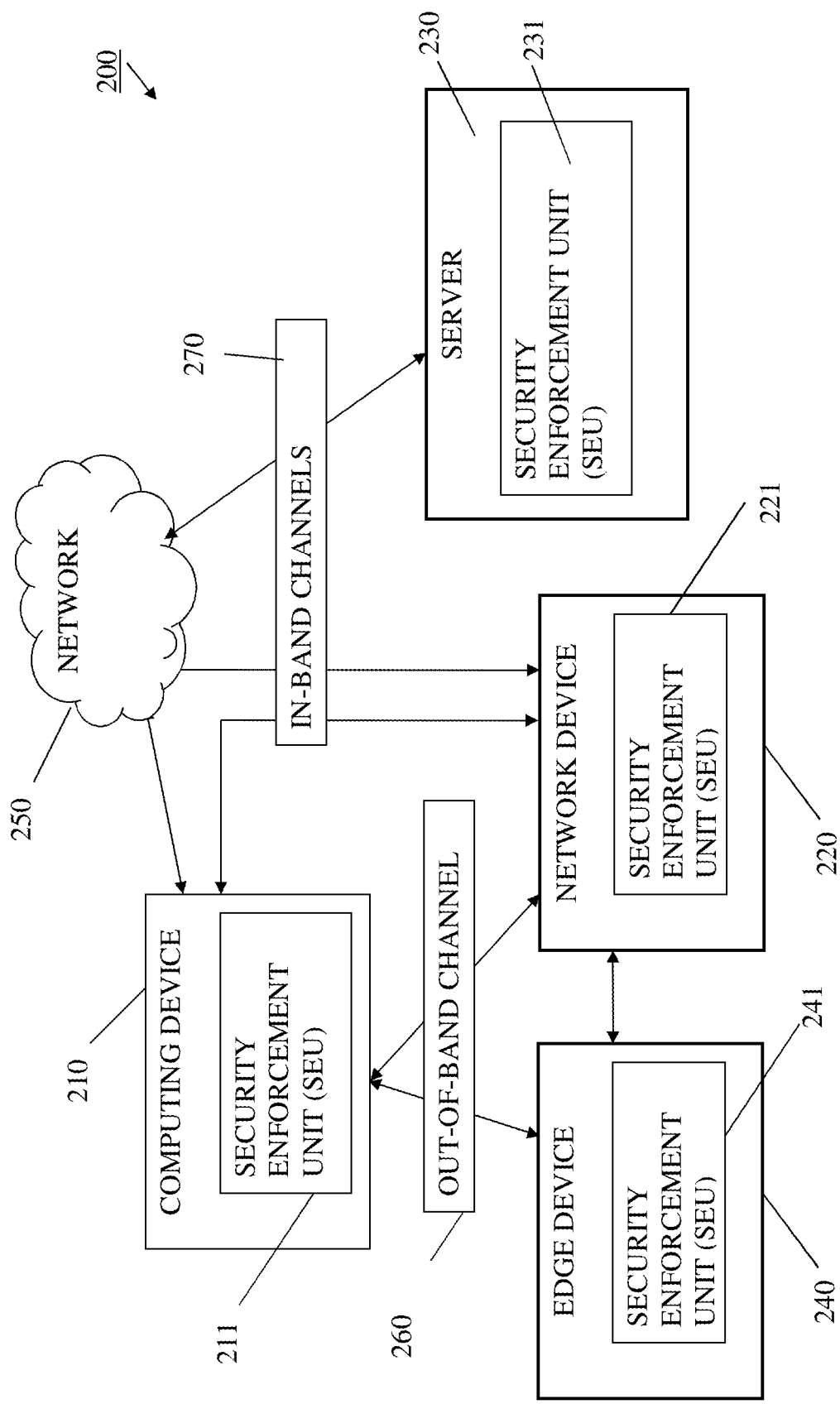
FIG. 2 is an overview of a system according to illustrative embodiments of the present invention.

For example, the components shown in FIG. 2, e.g., security enforcement units 211, 221 and 231 as further described herein may be, or may include components of, computing device 100, e.g., include a controller 105, a memory 120 and executable code 125. For example, by executing executable code 125 stored in memory 120, controller 105, e.g., when included in a security enforcement unit as described, may be configured to carry out a method of enforcing security by for example, executing software or code stored in memory 120. For example, included in a security enforcement unit in a first device, controller 105 may be configured to obtain a first value that may also be obtained by a remote (or second) device; randomly select a second value and send the second value to the remote device; use the first and second values to define a third value; and use the third value to secure a communication channel with the remote (or second) device and/or use the third value to authenticate the remote device.

Storage system 130 may be or may include, for example, a hard disk drive, a Compact Disk (CD) drive, a CD-Recordable (CD-R) drive, a universal serial bus (USB) device or other suitable removable and/or fixed storage unit. Content may be stored in storage system 130 and may be loaded from storage system 130 into memory 120 where it may be processed by controller 105. In some embodiments, some of the components shown in FIG. 1 may be omitted. For example, included in a network hub, a smartphone, cellular phone, or in a wearable device, memory 120 may be a non-volatile memory or a non-transitory storage medium having the storage capacity of storage system 130. Accordingly, although shown as a separate component, storage system 130 may be embedded or included in memory 120.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays or monitors, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, any one or more of a wired or wireless network interface card (NIC); a WiFi or Bluetooth component or chip; a universal serial bus (USB) device; or an external hard drive may be included in, or connected to computing device 100 by, input devices 135 and/or output devices 140.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal or laptop computer, a server computer, a network device, a smartphone, smartwatch or other mobile device, an IoT device or object, or any other suitable computing device. An IoT device may include any component or system enabling the IoT device to communicate over a network (e.g., over the internet or over a WiFi or Bluetooth network). For example, an IoT device may be designed or adapted to communicate with remote devices using the internet protocol (IP). Accordingly, a system as described herein may include any number of devices such as computing device 100.

Reference is made to FIG. 2, an overview of a system 200 according to some embodiments of the present invention. As shown, system 200 may include a security enforcement unit (SEU) 211 that may be, or may be included in, computing device 210. Computing device 210 may be, or may include components of, computing device 100. For example, computing device 210 may be a laptop, a server, a smartphone, a smartwatch or another wearable or mobile device and SEU 211 may be or may include: memory 120; executable code 125; and controller 105.

As further shown, system 200 may include a network device 220 that may include an SEU 221, for example, network device 220 may be a network hub, network router or any other device connected to a network. For example, network device 220 may be a device connected to an in-house network, e.g., a local and/or secured WiFi network, a private IP network and the like.

As further shown, system 200 may include edge device 240 that may include an SEU 241, for example, edge device 240 may be an IoT device or any other device connected to a network. Server 230 may be a network server as known in the art and may include an SEU 231 as shown.

Figure 3:
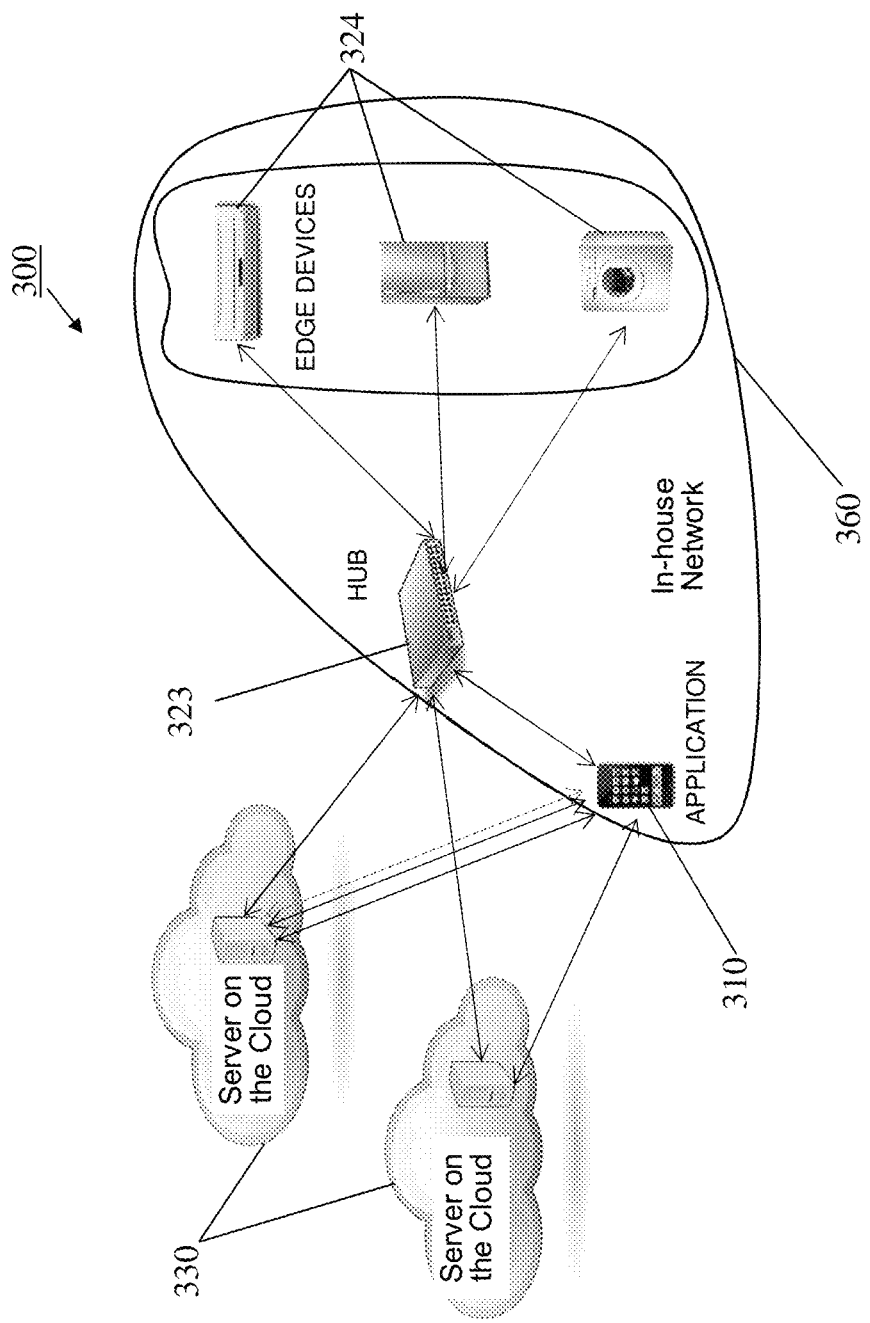
FIG. 3 is an overview of a system according to illustrative embodiments of the present invention.

For the sake of clarity, only one server 230, one computing device 210, one network device 220 and one edge device 240 are shown in FIG. 2. However, it will be understood that any (possibly large) number of servers 230, computing devices 210, network devices 220 and edge devices 240 may be included in system 200. For example, system 200 may include or connect several servers 230 (e.g., as shown in FIG. 3), several computing devices 210 (e.g., a laptop, a smartphone or a server), a plurality of network devices 220, e.g., several network hubs and any number of edge devices 240 such as IoT or other edge devices, e.g., IoT devices or units in a washing machine, a climate control system and an insulin pump. Each of devices 220, 240 and server 230 and/or SEUs 211, 221, 231 and 241 may be, or may include components of, computing device 100 as described with respect to computing device 210, it will therefore be understood that any function, operation or logic performed by one SEU as described herein may be performed by other SEUs.

Each of SEUs 211, 221 and 231 may be, or may include components of, computing device 100, and it will be understood that any function, operation or logic performed by one of these SEUs as described herein may be performed by other SEUs.

Network 250 may be, may comprise or may be part of a private or public IP network, or the internet, or a combination thereof. Additionally or alternatively, network 250 may be, comprise or be part of a global system for mobile communications (GSM) network. For example, network 250 may include or comprise an IP network such as the internet, a GSM related network and any equipment for bridging or otherwise connecting such networks as known in the art. In addition, network 250 may be, may comprise or be part of an integrated services digital network (ISDN), a public switched telephone network (PSTN), a public or private data network, a local area network (LAN), a metropolitan area network (MAN), a wide area network (WAN), a wireline or wireless network, a local, regional, or global communication network, a satellite communication network, a cellular communication network, any combination of the preceding and/or any other suitable communication means. Accordingly, numerous elements of network 250 are implied but not shown, e.g., access points, base stations, communication satellites, GPS satellites, routers, telephone switches, etc. It will be recognized that embodiments of the invention are not limited by the nature of network 250.

Out-of-band channels 260 may be, or may include, a direct line of site (e.g., enabling a user to read a code printed on a device), a Short Message Service (SMS) message sent from a trusted person, a push notification or message from a server, a conversational exchange between one or more people, e.g. a verbal conversation, a conversation via telephone, electronic mail (email) and the like. It will be understood that, where applicable, an out-band-channel may be established between any two entities or devices included in an embodiment, and that not all possible out-of-band channels are shown in FIG. 2, e.g., although it may be established, an out-of-band channel between computing device 210 and server 230 is not shown.

In-band channels 270 may be, or may include, a network connection or channel, e.g., in-band channels 270 may be one or more of: a Transmission Control Protocol (TCP) connection; a Secure Sockets Layer (SSL) session; or a sequence of User Datagram Protocol (UDP) packets over network 250. For example and as shown, an in-band channel may be established between server 230 and network device 220 or between server 230 and computing device 210 (e.g., over network 250 that may include the internet) and/or between computing device 210 and network device 220, for example, a TCP connection between computing device 210 and network device 220 may be established over a private or public IP network, e.g., over a network inside an organization or over the internet. It will be understood that not all possible in-band channels are shown in FIG. 2, e.g., although it may be established, an in-band channel between edge device 240 and computing device 210 is not shown.

An embodiment may provide, to at least two devices, a secret (e.g., one or more secret values 128 that may be used for encrypting data) without exposing the secret to any device other than the at least two devices, that is, an embodiment may make it impossible for any device other than the two devices to reveal the secret. For example, a secret may be revealed by the two devices using a first value that may be provided or known to, or obtained by, the two devices (e.g., one of known values 127) and a second value that may be randomly selected by one of the devices (e.g., one of generated values 126) wherein the first value is communicated or provided over a first channel (e.g., an out-of-band channel) and the second value is communicated or provided over a second channel (e.g., an in-band channel).

An embodiment may authenticate a first device by, or to, a second device in a manner that makes it impossible for any third or other device to obtain enough information that may enable the third or other device to be falsely authenticated. For example, a successful establishment of a secured channel between edge device 240 and network device 220 may cause edge device 240 to identify or mark network device 220 as an authenticated device.

Reference is made to FIG. 3, an illustrative example of a system 300 according to some embodiments of the present invention. As shown, system 300 may include servers on the cloud 330, an in-house network 360 and, in the in-house network 360, a computing device and application 310, a hub 323 and a set of edge devices 324.

Cloud servers 330 may be similar to server 230, edge devices 324 (that, as shown may include devices such as a refrigerator, air conditioning system and a washing machine) may be similar to edge device 240, hub 323 may be similar to network device 220 and computing device and application 310 may be similar to computing device 210. For example, each of servers 330, hub 323, device and application 310 and edge devices 324 may include a controller, memory and executable code as described with respect to computing device 100 and/or servers 330, hub 323, device and application 310 and edge devices 324 may include an SEU such as SEU 211.

In some embodiments, pairing two devices for the first time may include using at least two communication channels, one of which may be an out-of-band communication channel (also referred to herein as out-of-band channel). Pairing devices may include authenticating the devices to one another and/or establishing a secured communication channel between the two devices. For example, when a new washing machine (edge device) that includes IoT capabilities as described herein is first connected to in-house network 360, a user may use device 310 (e.g., a smartphone as shown in FIG. 3) to obtain a value (e.g., a unique serial number) by scanning a barcode on the washing machine.

The value obtained by device 310 as described may be known to the washing machine, e.g., the unique serial number may be stored in ROM of an IoT component in the washing machine and/or in an SEU in the washing machine. Accordingly, possibly using an out-of-band channel, e.g., a line of site between a user of computing device 310 and the washing machine, a value in a barcode may be (or may be used to define, calculate or generate) a value that is known to the washing machine (a first device) and device 310 (a second device), for example, the value in the barcode may be stored as one of known values 127 in a smartphone and in the washing machine.

A second value may be known to the washing machine and smartphone (the two devices) in a similar way, e.g., a second value that is a unique ID of the washing machine may be generated and stored in a ROM of the washing machine (e.g., by a manufacturer) and may be displayed, by an SEU in the washing machine, on a control screen of the washing machine thus enabling a user to read and enter the second value into an SEU of device 310. For example, the second known value may be stored as another one of known values 127 in SEUs in the washing machine and a smartphone. Accordingly, two out-of-band channels may be used in order to achieve a state where two devices have, store, include or possess a first and second values. It is noted that using an out-of-band channel for sharing at least one of the first and second values (also referred to herein as shares used for secret sharing) as described prevents devices connected to network 360 from knowing or having both the first and second values, since at least one of these values is never communicated over a computer communication network.

In some cases, the first value may be shared using an out-of-band channel as described, and the second value may be shared over a network, in-band connection or channel. For example, an SEU in smartphone 310 may randomly generate the second value and send the generated second value to the washing machine over network 360, e.g., in a UDP packet. Of course, a device (e.g., a network sniffer) on network 360 may intercept the communication of the second value; however, as described herein, the second value may be useless without the first value.

In some embodiments, using a first and a second values (e.g., a known value 127 and a generated value 126) known to two devices, a secret may be revealed by, or known to, the two devices. For example, the secret may be a third value that may be calculated or determined based on the first and second values. For example, using one or more known values 127 and one or more generated values 126, one or more secret values 128 may be calculated, derived or determined and may be stored in a memory as shown by secret values 128.

An authentication may be based on one or more secret values 128. For example, to authenticate the washing machine in the above example, an SEU in device 310 may, using one or more secret values 128 as an encryption key, encrypt a message (for which a respective specific response is expected) and send the encrypted message to the washing machine (e.g., to an SEU in the washing machine), if a response from the washing machine is as expected, then the SEU in device 310 may determine or conclude that the SEU in the washing machine knows, includes or has the secret and is therefore authenticated, e.g., since the SEU in the washing machine successfully decrypted the message, generated an expected response, and encrypted the response. An authentication of a device may be explicit, e.g., as described herein or it may be implicit, e.g., successful exchange of data that is encrypted using a secret value 128 may authenticate a device, e.g., the washing machine may be authenticated by a smartphone if it sends expected data or messages or correctly responds to messages.

As described, any number of generated values 126 for defining or calculating one or more secret values 128. For example, a secret value 128 may be the free coefficient of a polynomial or the highest coefficient of the polynomial (also referred to as the first and last coefficients of the polynomial), or any other coefficient or combination of coefficients. Accordingly, to determine or calculate a secret value 128, an SEU may use several points on a curve representing the polynomial.

For example, a polynomial p(x) of degree K may be defined or represented by:

$$p(x)=S+a_1*x+a_2*x^2+\ldots a_k*x^k \qquad \text{Equation 1}$$

In some embodiments of secret sharing, S and/or $a_k$ in equation 1 may be treated and used as secret values 128, e.g., S and/or $a_k$ may be stored as secret values 128 and used for authentication and encryption, by SEUs, as described. In some embodiments, the coefficients $a_1 \ldots a_k$ of p(x) may be randomly chosen, e.g., by an SEU. A set of at least k+1 values (or inputs) for a set of $x_0 \ldots x_k$ may be randomly selected or chosen, e.g., by an SEU, and a respective set of values (or results or outputs) $y_i$ may be calculated by $y_i=p(x_i)$. Accordingly, a set of pairs $(x_i,y_i)$ for p(x) may be generated. A pair of values $(x_i, y_i)$ calculated for a polynomial as described may be referred to herein as a point on, or of, the polynomial. Using k+1 points of a polynomial of degree k, the polynomial can be constructed and S (or $a_0$, the free coefficient) and/or $a_k$ (the highest or last coefficient) can be revealed. For example, in order to construct the line equation p(x)=ax+b, 2 points $(x_1,y_1)$ and $(x_2,y_2)$ are required and sufficient and the two points enable determining the value of b.

For example, a first pair of $(x_i,y_i)$ values of p(x) may be stored in a first generated value 126 in edge device 240 and in network device 220, a second, different, pair of values $(x_{i+1},y_{i+1})$ may additionally be stored in a second, different, generated value 126 of both edge device 240 and network device 220 and so on. Accordingly, each of edge device 240 and network device 220 may obtain, possess, store or include at least k+1 pairs, values or points of (or on) p(x), may therefore unambiguously identify or characterize p(x) and thus determine S and/or $a_k$ in equation 1.

As described, a degree of p(x) may be predefined (e.g., hard coded or otherwise known to two or more SEUs). To increase security, in some embodiments, the degree of p(x) may be selected or set dynamically or automatically, e.g., a first device may randomly select the degree and inform the second device of the degree. In yet other embodiments, using a function or logic that takes into account, for example, the current date, current time or other dynamic value, two SEUs may determine the degree of p(x) that will be used. Once the degree of p(x) is known to two devices, the two devices may readily know the number of points that need to be shared as described.

In some embodiments, two or more devices may share the generation of values or points that define a polynomial. Moreover, in some embodiments, a polynomial p(x) needs not be defined, predefined or known in advance. For example, p(x) may be defined (and identified) based on a random set of points or pairs of $(x_i,y_i)$ values that may be generated or selected by two devices.

For example, a set of at least k+1 of points (e.g., pairs of input and output values of the polynomial) for a polynomial may be randomly selected (e.g., some may be selected by a first device or entity, and some by another or second device or entity) and may be sent from one entity or device to another entity or device such that none of the devices on or along the routes that are used can obtain, capture, intercept or see k+1 or more points. It is noted that a subset of less than k+1 points is useless in determining, identifying or characterizing a polynomial of degree k, for example, one point (e.g., one set of $(x_i,y_i)$) is insufficient or useless for determining, identifying or characterizing a polynomial p(x) of degree k=1 defined or characterized by $a_0+a_1x$ since at least k+1 (2 in the case of k=1) points are required in order to define, determine, characterize or unambiguously identify polynomial of degree k.

For example, SEU 211 may randomly select a degree of six (k=6) for a polynomial and may further randomly select three (3) points, or pairs of input and output values of the polynomial, and send the degree and the three points to SEU 221. SEU 221 may randomly select four (4) points or pairs and send the selected four points to SEU 211. Thus, an embodiment achieves a state where SEU 211 and SEU 221 both have seven points for a polynomial of degree six and are therefore able to unambiguously identify, determine or characterize the polynomial and its coefficients (e.g., $a_0$, $a_1$ and so on). As described, the points or pairs may be communicated between SEU 211 and SEU 221 over at least two different network routes, such that no single entity on, or connected to, network 250 (or any other network for that matter) can obtain k+1 pairs or points included in the set of at least k+1 pairs or points exchanged between a first and a second device as described.

Routes, links, connections and/or channels as described herein may be logical, physical or a combination thereof. For example, a logical route, link or channel may be a TCP connection or an SSL connection and a physical route, link or channel may be a direct line or data bus connecting two or more devices. For example, several routes, links and/or channels may be established between computing device 210 and edge device 240 using a set of TCP connection (logical) and one or more physical lines, routers or wires (physical). A set of different logical connections may be established over one or more physical connections. Generally, a set of logical routes, links or channels may be established over the same infrastructure, e.g., same network cables and routers. For example, a set of different applications or social networks (e.g., Facebook, WhatsApp and the like) may use the same infrastructure to setup and use a set of different logical connections that use different protocols, encryption techniques, etc. A set of different physical routes, links, connections and/or channels may be established on a respective set of different infrastructures, e.g., a wired network infrastructure, a cellular network and/or WiFi.

As further described herein, different routes, links, connections and/or channels may include, traverse or established using different devices or nodes. For example, a first route, link, connection and/or channel between server 230 and edge device 240 may be established through or via network device 220 (e.g., using routing as known in the art) and a second route, link, connection and/or channel between server 230 and edge device 240 may be established through or via computing device 210. A link, connection or channel may be an out-of-band link, channel or connection as further described herein.

After constructing the polynomial from the K+1 pairs, SEU 211 and SEU 221 may calculate or reveal a secret, e.g., the secret revealed, identified or determined by SEU 211 and SEU 221 may be based on a function of, or applied to, the polynomial or points of the polynomial. For example, a secret may be a function, or a result of a function of, or applied to, at least one of the first and/or last coefficient of the polynomial as described. A function of, applied to, or that uses as input, at least one of the first and last coefficients of a polynomial may include any mathematical manipulation of numbers that produces a result as known in the art. For example, a function of at least one of the first and last coefficients of a polynomial may include multiplying the free coefficient of a polynomial by the highest coefficient, or it may include dividing the highest coefficient by the free coefficient and then adding one of these coefficients to the result, where the mathematical operations are defined over a finite field. A result of a function of at least one of the first and last coefficients of a polynomial may be a number or value, e.g., an output or result of a mathematical function as known in the art.

Any function, mathematical function or mathematical computation (e.g., one known only to SEUs) may be applied to a secret in order to determine or generate an encryption key, seed or other value that may be used for securing a communication channel. For example, to generate an encryption key that may be used to encrypt data or otherwise secure and authenticate a communication channel between SEU 211 and SEU 221 and/or between computing device 210 and network device 220, a coefficient of a polynomial determined, discovered or identified as described may be multiplied by two, divided by three and the like, and the result may be the encryption key, seed and the like.

It will be noted that the two devices sharing a secret as described herein may be any two devices, e.g., a client and a server such as computing device 210 and server 230 may each generate some of the k+1 points that define a polynomial, share the points as described and thus reveal or determine a secret that may be based on a function of the polynomial, and likewise network device 220 and edge device 240 may share a secret. It will be understood that any computing device may include an SEU as described and, accordingly, any computing device may participate in sharing a secret as described herein.

As described, a set of values (e.g., a set of points of a polynomial) may be sent or exchanged between devices over a set of different routes or communication channels. For example, SEU 211 may generate a set of k+1 points, store the set in a local set of generated values 126 and send the set of k+1 points to SEU 221 using (at least) two (physical or logical) different channels, e.g., using an in-band and an out-of-band channel, two out-of-band channels, two in-band channels or any combination of channels or routes as described.

Secret value 128 may be calculated separately on both devices or sides, e.g., SEU 211 and SEU 221 may each, independently from one another, determine or identify $p(x)$ based on k+1 points as described, determine the free or highest coefficient of $p(x)$ and use the coefficient as, or to generate, secret value 128, e.g., secret value 128 may be the coefficient itself, or it may be calculated based on the coefficient using any mathematical function or algorithm, for example, secret value 128 may be calculated, by SEUs, based on a coefficient of $p(x)$ and based on the current time and/or date or using any mathematical function, algorithm or logic.

In some embodiments, to share a secret (e.g., an encryption key or a seed as known in the art) between two devices, at least two values may be provided, or made known to, the two devices, for example, the two values may each be, or include or represent, a point, or a pair or set of input and output values $(x_i, y_i)$ of a polynomial $p(x)$ and the secret may be a function of, or based on, these values, e.g., a mathematical function or manipulation of, or applied to, coefficients of a polynomial defined by the points as described.

It is noted that the at least two values may be randomly selected by the first device or may be randomly selected by the first device and the second device. For example, the first device may randomly select a first point of (yet to be defined by an additional point) $p(x)$ and send the first point to the second device, and the second device may randomly select a second point that completely defines $p(x)$ and sends the second point to the first device. Assuming $p(x)$ is of first degree, the two points randomly selected as described enable the two devices to unambiguously identify $p(x)$. Of course, any higher degree of $p(x)$ may be chosen and used, e.g., by causing embodiments to randomly select share more points as described.

As described, some embodiments of the invention address challenges faced by the industry. For example, unlike any other existing authentication schemes, some embodiments of the invention avoid exchanging or communicating a secret, and avoid sending a secret over a network as done by known systems and methods. For example, secret value 128 may be known (e.g., based on a set of points as described) to SEU 241 and SEU 221 without ever being transmitted or sent from one of these SEUs to the other.

The process of generating, sending and using a set of values to determine a secret as described herein may be done either once for two devices, e.g., on initialization, or may be done before each session. For example, a communication channel between edge device 240 and network device 220 may be terminated as known in the art and, to establish a new channel between these devices, the flow that includes generating and sharing values, identifying or constructing a polynomial, determining a coefficient and a secret as described herein may be repeated. For example, a first point may be defined (provided or sent) once (e.g., when a new device is added to a network), e.g., over an out-of-band channel and the other points may be sent over a network before each session.

Although examples that include providing a first value to a first device over an out-of-band channel and providing a second value (to the first and/or to a second) device over an in-band channel are described herein, it will be understood that any combination of in-band channels and out-of-band channels may be used to share values or points between two devices. For example, two different routes or in-band channels may be used to share or communicate points between network device 220 and edge device 240 or two out-of-band channels may be used to share values or points between these two devices. It will further be understood that, for the sake of clarity and simplicity, the description mainly refers to two values shared over two channels, and any number of values may be shared over any number or combination of channels that may be out-of-band and in-band channels. For example, to authenticate edge device 240 to computing device 210, a polynomial of degree 5 may be used and, accordingly, six different values may be shared between edge device 240 to computing device 210 as described, e.g., over two out-of-band channels and four in-band channels.

Yet another improvement to the field of security and authentication introduced or enabled by some embodiments of the invention has to do with providing an edge device with a first or initial point or value that may be used, in conjunction with a second value sent before each session, to determine a secret used for securing data as described. For example, using an initial value, edge devices do not need to keep or store a private key when they are not communicating over a network. This may be highly advantageous, e.g., in cases where the edge device does not have the capacity to dynamically and securely store data, for example, in that case of IoT devices or environment where the edge devices have low CPU power and minimal unsecured hardware (e.g. a light bulb).

A number of scenarios, use cases and/or flows that exemplify some embodiments of the invention are further described herein with reference to FIG. 3. For example, channels that may be secured are between hub 323 and device (or application) 310, between, or connecting, hub 323 and one or more of edge devices 324, between one or more of servers 330 and device (or application) 310, and between servers 330 and hub 323.

For example, to secure a channel between hub 323 and device 310, a Quick Response (QR) code or a two-dimensional barcode of hub 323 may be provided, e.g., by scanning printed data on hub 323 (an out-of-band channel), to device 310. Hub 323 may be familiar with the QR code (e.g., it may be stored in a ROM in hub 323). As known in the art, a QR code may be a machine-readable optical code or label that contains or represents information about an object, item or appliance to which it is attached. Any information or value, e.g., a serial or model number, a unique identification code, production date and the like may be included in, or represented by, a QR code.

In some embodiments, a value in a QR code (e.g., a value in a QR code printed on hub 323) may be used as one or first point of p(x), and a second point may be randomly generated by device 310 or by hub 323. For example, hub 323 may, e.g., when turned on, generate a random value or second point and send the second point to device 310, e.g., over network 360 (an in-band channel). The two points may be used to determine a secret, e.g., secret value 128 as described. It is noted that the secret may never be sent over network 360 or over any other network, and thus it may be impossible for any device on network 360 or network 130 to obtain the secret.

Yet another improvement to the field of security and authentication introduced or enabled by some embodiments of the invention is related to lost, stolen or malfunctioning devices. For example, if hub 323 is stolen or replaced, data in hub 323 cannot be used for hacking communication of a replacement hub, and similarly, if device 310 (that may be a mobile device or smartphone) is lost or stolen, data in device 310 cannot be used to jeopardize communication in network 360, e.g., since at least a second point as described may be dynamically defined, e.g., for each session or each time hub 323 is rebooted, reset or powered on.

To secure a channel between hub 323 and one of edge devices 324, a Quick Response (QR) code or a two-dimensional barcode of the edge device may be provided, e.g., by a user, to hub 323 (an out-of-band channel), and the rest of the flow may be similar to the flow of securing a channel between device 310 and hub 323. As described herein, a lost or stolen edge device does not include data usable for decrypting data communicated between devices on network 360, e.g., since a second point as described may be dynamically generated for each session thus a point in a memory of a stolen edge device may be useless.

To secure a channel between one of servers 330 and device 310, multiple channels, e.g., a number of SSL channels, a push notification from the cloud server to device 310 (e.g., to SEU 211), an SMS, a WhatsApp or any other communication channel may be used, channels that are typically already secured and used for a while. Each of the channels may be secured by the application that is used to send data over it, for example, only the owner of device 310 can send push notification to SEU 211 or channels may be secured by a cloud service (e.g. as provided by Apple or Google).

Some embodiments may include inductive multi-route authentication and common secret establishment using parties or devices that already (possibly incrementally) established trust (possibly via inductive multi-route authentication and common secret establishment) with a new device by using secret sharing. The term "trust" as referred to herein may relate to, or mean, authentication, verification or identification. For example, an identified device may be referred to herein as a trusted device, and authenticating or identifying a device may be referred to herein as establishing a trust in the device and so on.

For example, a device (e.g., denoted "device A") may use authenticated and secure communication with one or more entity/device that are capable to communicate with a new or additional device (e.g., denoted "device N") with which there is a need to create a common secret, e.g., in order to authenticate the new device N and/or establish a secured channel between device A and new device N. Some values or points may be sent, to device N, through direct physical/logical communication channels while other values or points may be sent, to device N, via an already trusted entity or device (possibly trusted due to the previous steps of the inductive multi-route authentication and common secret establishment).

Accordingly, authenticity or trust level of the new device N may be yielded from, based on, or a function of, the authenticity of each of the already trusted or authenticated devices that directly communicate with the new device and the corresponding authenticity or trust level of the direct channel used by device A when directly communicating with device N. The authentication level obtained implies also the secrecy level obtained following the establishment of a shared key or other secret between the sender and the new device. For example, device A may be server 230, new device N may be edge device 240, and SEU 231 may use an already trusted or authenticated connection between server 230 and network device 220 to send one of a set of values to edge device 240, e.g., SEU 221 may receive a value from SEU 231 and may forward the value to SEU 241 over a secured communication channel, e.g., a communication channel secured as described herein.

A secured channel between a first and a third device may be used for communicating a point (or any other value in a set of values that may be used for sharing a secret as described) from the first device to a second device. For example, one of servers 330 may use a secured channel with device 310 (e.g., a channel secured as described herein) to send a point or first value to hub 323, e.g., device 310 may receive the first value from one of servers 330 and send the first value, over another secured channel, to hub 323 thus resulting a state where the server and hub 323 have or possess a first known value, e.g., the server and hub 323 store (and treat) the first value as a known value 127. Next, either one of hub 323 and the server may generate, e.g., randomly as described, a second value or point and send the second value or point to the other one of hub 323 and the server, having at least two points, and the server and hub 323 may identify or reveal a secret as described and use the secret to encrypt data exchanged between the server and hub 323, e.g., a secret value 128 may be used for generating or defining, an encryption key. It is noted that one of the points may be sent over a route that traverses device 310, and the other point may be sent directly from hub 323 to server 330—thus, the two points are sent over different routes, disabling any device other than hub 232 and server 330 (or other foreign party) from obtaining the two points or values. The order of authenticating devices in the above example may be other than described; for example, if hub 323 provides an interface to manually enter the first value or point, then the secured channel between hub 323 and one of servers 330 may be setup first, and the secured channel between the server and device 310 may come next.

As described, based on a common or known secret, devices may authenticate each other. Possibly after an authentication as described, an embodiment may enable a protected and/or secured exchanged of data between devices.

In some embodiments, data communicated from one device to another may be sent over several channels, routes, links or lines, e.g., data may be sent over several channels or routes as described herein with reference to the points or value pairs. Different channels or routes may include or traverse different sets of devices. For example, a first channel, route, link or line between a first and second devices may traverse, pass, or be implemented using a third device (e.g., a first network router or any other device), and a second channel, route, link or line between the first and the second devices may traverse, pass, or be implemented using a fourth device (e.g., a second, different network router or any other device).

In some embodiments, a data object to be sent (e.g., a message or file) may be broken into chunks, blocks or pieces, and each of the chunks blocks or pieces may be sent using secret sharing or bit-wise-x or over at least two channels, routes, links or lines such that no entity or device can obtain or possess enough chunks or pieces of the data object for reconstructing the data object.

For example, in some embodiments, between each two devices (e.g., between device 310 and hub 323) there are at least two different channels, links or routes (e.g., at least two different physical or logical channels, links or routes as described). Each such channel may be composed of two or more links, where each link may be a secure channel between two entities. For example, in a smart home, a light bulb can communicate with a central hub in two channels, of which one or first channel may be a direct channel, link or connection from the light bulb to the hub, and the other, second channel may pass through some other device, such as a refrigerator, and thus the second channel may be composed of two secure links, one from the light bulb to the refrigerator and the other from the refrigerator to the hub.

A secret, e.g., secret value 128 may be used for securing or protecting data, e.g., as known in the art, for example, secret value 128 may be used as a symmetric key in a symmetrical encryption algorithm or technique, e.g., in AES256 as known in the art.

Figure 4A:
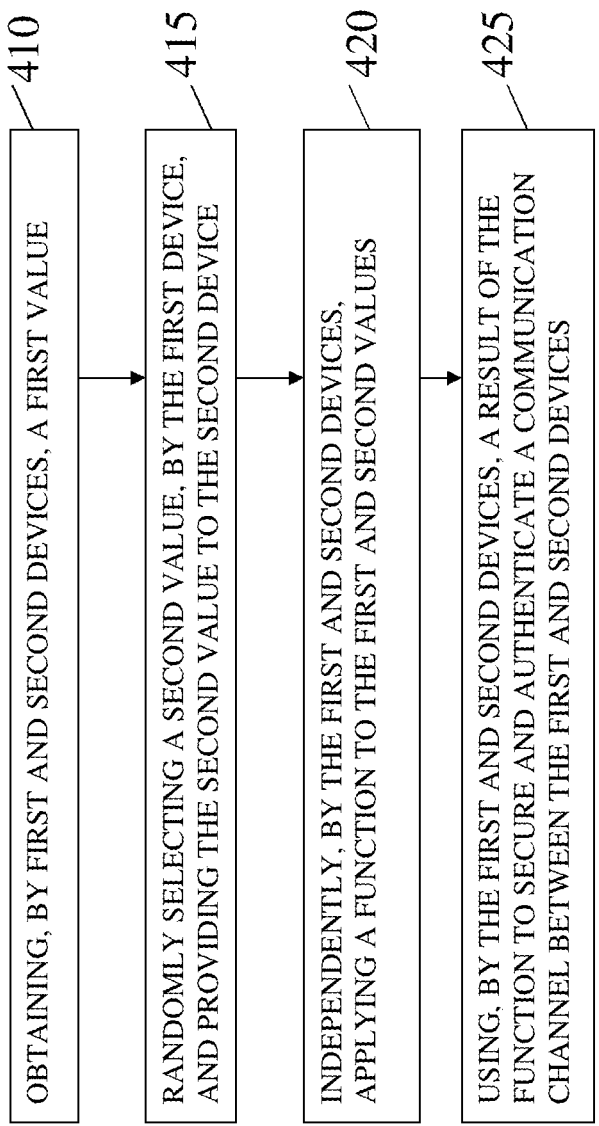
FIG. 4A shows a flowchart of a method according to illustrative embodiments of the present invention.

Reference is made to FIG. 4A, a flowchart of a method of securing a communication channel and/or authenticating a device according to illustrative embodiments of the present invention. As shown by block 410, a first value may be provided to, or obtained by, first and second devices. For example, SEU 211 in computing device 210 and SEU 221 in network device 220 may obtain and store a known value 127 as described herein. For example, the first value may be based on a barcode provided over an out-of-band channel as described.

As shown by block 415, a second value may be randomly selected, by one of the first and second devices, and the second value may be provided to the other one of the first and second devices. For example, SEU 211 may randomly select an $(x_i, y_i)$ point as described and send the values of $x_i$ and $y_i$ to SEU 221, e.g., over a network connection in network 360 (an in-band channel) as described. For example, the point values $x_i$ and $y_i$ may be sent from one of SEU 211 and SEU 221 to the other one of SEU 211 and SEU 221, and may be stored or included as known value 127 in SEU 211 and in SEU 221.

As shown by block 420, a function may be applied, independently by each of the first and second devices, to the first and second values. For example, the first and second values may be used, independently, by the first and second devices to calculate, define or determine a third value. For example, a mathematical function may combine, convert or otherwise manipulate the first and second values to generate an encryption key that may be used for encrypting date communicated between the first and second devices. In some embodiments, coefficients of a polynomial determined by the first and second values may be used, for example, SEU 211 may independently from SEU 221, e.g., without requiring any communication, collaboration or synchronization with SEU 221, identify or determine polynomial's coefficients as described. Similarly, SEU 221 may identify the coefficients independently from SEU 211, and any mathematical function may be used by SEUs 221 and 211 for generating an encryption key based on the coefficients. Accordingly, two devices may, independently from one another, use two values to secure a communication channel between them or to authenticate each other.

Various flows of providing the first and second values may be contemplated. For example, the first value (e.g., a known value 127) may be provided to the first and second devices, e.g., a user may enter a known value 127 to his smartphone and to hub 323 (e.g., when hub 323 includes the proper interface). In other embodiments or flows, the first value may be provided to one of the devices (e.g., to hub 323) and sent over an out-of-band channel to the other device.

As shown by block 425, a result of the function may be used to secure and authenticate a communication channel between the first and second devices. For example, a result may be third value that may be an encryption key or seed that may be used for encrypting data as described. Accordingly, the third value may be used, by the first and second devices, to secure and authenticate a communication channel between the first and second devices. For example, secret value 128 may be used as, or for generating, an encryption key for encrypting data between devices as described. For example, secret value 128 may be used to define an encryption key and the encryption key may be used to encrypt data communicated over a secured communication channel as described herein.

Authentication of a device may include determining or ascertaining that the device possesses a specific set of first and second values. For example, secret value 128 may only be revealed or known based on at least two values, e.g., based on two generated values 126, based on two known values 127 and/or based on a set of one generated value 126 and one known value 127 as described, and accordingly, using secret value 128, e.g., to encrypt and send a predefined message, may prove or ascertain that a device has the two values and is therefore authenticated.

Any number of generated values 126 may be used, e.g., during a process of authenticating a device or sharing a secret value such as secret value 128. For example, if the polynomial selected as described is of a third degree, then four points may be required. In such case, the first of the four may be a known value 127 shared as described, and three generated values 126 that may be generated and sent, over multiple routes as described.

It will be noted that generating, creating or defining generated values 126 may be done by one of two devices between which a secured communication channel is established, or some of the generated values 126 may be created, defined or generated by a first device and sent to the second device and some (other) of the generated values 126 may be created, defined or generated by the second device and sent to the first device. For example, in the above case that requires four points, after sharing a known value 127, device 310 may generate first and second points (e.g., two sets of $x_i$ and $y_i$ values as described) for a polynomial and send these first and second points to hub 323, and hub 323 may generate a third point for the polynomial and send the third point or value to device 310. Having the same four points, hub 323 and device 310 may each identify the polynomial and the coefficients as described. Accordingly, the task or operation of generating, creating or defining generated values 126 may be shared by at least two devices.

As described, at least two routes may be selected for sending points or values, e.g., hub 323 may send, to device 310, a first generated value 126 through one of servers 330 and send a second generated value 126 through one of edge devices 324, and accordingly none of the devices or entities in system 300 can intercept, have or obtain enough points to unambiguously identify a polynomial since a flow may avoid communicating all the points through one device. For example, values or points may be sent, from a first to a second device such no single entity on a network obtains more than a predefined number of values or points included in the set.

For example, in the above case that requires four points, device 310 may select two, three or four channels, routes or links for sending the four points such that none of the entities in FIG. 3 can obtain, intercept or capture all of the four values or points. The routes selected may be logical routes (e.g., network routes) or physical routes or links (e.g., a direct line or an out-of-band channel as described). Accordingly, a first value may be sent over a first communication channel, and a second value may be sent over a second, different communication channel. The values, e.g., generated values 126, may be encrypted prior to being sent, e.g., using any known encryption techniques as known in the art.

In some embodiments and as described, sharing one or more values between first and second devices, e.g., sharing one or more generated values 126 or points as described, may include sending at least one of the one or more values, from the first device to a third device over a secured communication channel between the first and third devices, and using the third device to provide the at least one of the one or more values to the second device. Communicating a set of values (e.g., one or more points or generated values 126) from a first device to a second device may include sending at least one of the values, from the first device to a third device, and sending or forwarding the at least one of the values from or by the third device to the second device. Otherwise described, a first device may send a value to the second device via a third device.

For example, in order to authenticate edge device 240, device 210 may send a value (e.g., a point of a polynomial as described) to network device 220 (e.g., over a secured channel and/or after device 210 has authenticated network device 220), and network device 220 may send or forward the value received from device 210 to edge device 240. A second value or point may be sent from device 210 to edge device 240 over any other channel, e.g., an out-of-band or other channel as described herein.

In some embodiments, authenticating a device and/or securing a communication with the device may be automatically triggered. For example, SEUs in devices may listen and/or broadcast on predefined (or well-known) ports, for example, when a new device is connected to network 360, e.g., after a reset or addition of an IoT device, SEU 221 may receive a UDP broadcast message from an SEU in the new device and may automatically initiate a session or process for authenticating the new device and/or establishing a secured channel with the new device, e.g., share a secret with the new device and use the secret to encrypt data exchanged with the new device.

In some embodiments, a known or first value used for securing a session or communication channel as described may be shared between two devices using a secured channel established in a previous session. For example, after establishing a secured channel as described herein, one of the devices may send, over the secured channel, a value, token or key that may be used, in a subsequent session as one of known values 127. For example, after a secured channel is established between server 211 and computing device 210, server 211 may randomly generate a value, store the generated value and send the generated value to computing device 210 that may store the value, e.g., in configuration data 133 or as one of known values 127. When a new session or communication channel needs to be established, the value generated in the current session may be used. Accordingly, after a first secured channel is established between two devices, subsequent channels or sessions between the two devices may be established using a secret already available to, or included in, the two devices, where such a shared secret can be repeatedly updated during the communication.

In some embodiments, an overlay technique may be used to secure communication scenarios such as client-server, business to business (B2B), client to business (C2B) and/or client to client (C2C). As referred to herein, a share or shares may be pieces or portions of data that may be used to determine or produce a secret or an original data object or value, e.g., a set of shares may be used to determine or reveal a password.

In some embodiments, an overlay technique may include secret sharing or other equivalent secure information theoretical schemes, e.g., exclusive-or, or exclusive-disjunction (xor) with a random sequence or using modular arithmetic as done, e.g. in one time pad practice as known in the art. An overlay technique may include sending shares (e.g., a set of values as described) over a set of communication channels, some or all of which are physical and/or some or all of which or are logical channels.

A logical communication channel may be, for example, a virtual private network (VPN), an SSL connection, a transport layer security (TLS) connection, a push notification, an instant messaging communication and/or any other system, method or protocol that may include authenticating and/or securing communication. Two or more logical communication channels may use the same physical channel or may use separate, different physical channels (e.g., wired and wireless channels as known in the art).

In some embodiments, an overlay technique may benefit from sending secret shares on (possibly encrypted) channels over physical and logical channels by ensuring that unless the information sent over all (or enough of) the channels used is captured and decrypted (when the logical channel is using its encryption) by a malicious entity, the information secret shares or other sent information is protected and secured, possibly by means of error correcting technique such as Berlekamp Welch. Accordingly, using an overlay technique or security as described herein, some embodiments of the invention may provide security that is stronger than the (currently) strongest authentication and security among the physical and logical channels used for sending the secret shares, as information on all channels should be revealed to expose a (possibly encrypted) secret shared or other information.

In some embodiments, an overlay technique may provide and/or ensure automatic inheritance of the secrecy, security and/or authenticity updates and/or enforcement of each of the logical and/or physical routes, links or communication channels. In some embodiments, a communication channel may be authenticated and secured even if a vulnerability in all but one of the channels used is exploited. In some embodiments, error correction techniques (e.g., the Berlekamp-Welch or Welch-Berlekamp algorithm) may be used for coping with malicious channels.

Figure 4B:
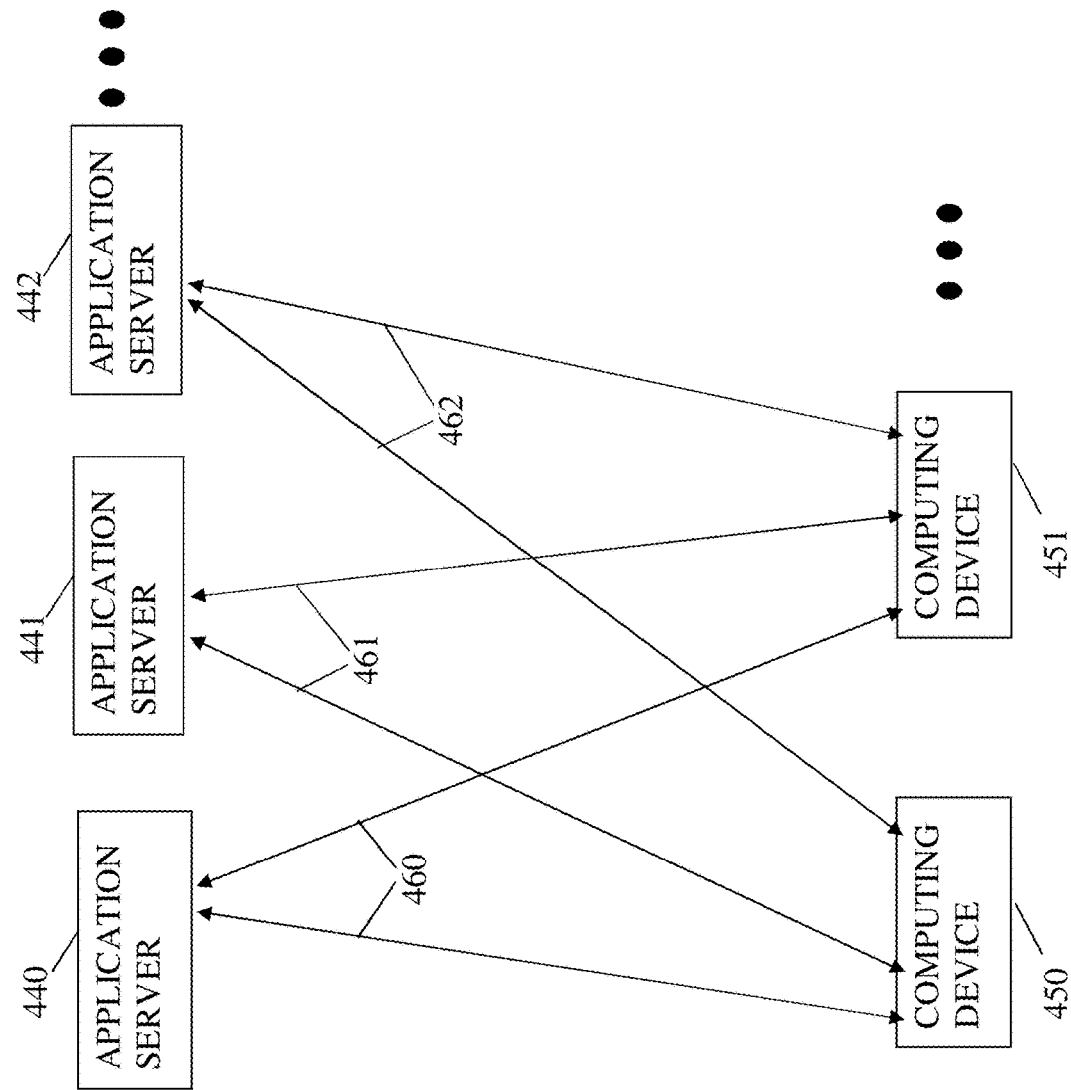
FIG. 4B shows a system and flows according to illustrative embodiments of the present invention.

Reference is made to FIG. 4B, a system and flows according to illustrative embodiments of the present invention. As shown, a system may include a plurality of application servers 440, 441 and 442. For example, application servers 440, 441 and 442 may be servers owned and/or operated by application providers such as WhatsApp, Facebook and the like. As shown, a system may include a plurality of computing devices 450 and 451. Computing devices 450 and 451 may be devices similar to computing device 100, e.g., computing devices 450 and 451 may be servers, laptops, home computers, smartphones or any other user computer devices. For the sake of clarity and simplicity, only three application servers and only two computing devices are shown in FIG. 4B; however, it will be understood that any number of application or other servers and any number of computing devices may be included or connected to a system according to some embodiments of the invention.

As known in the art, WhatsApp, Facebook and other applications encrypt data communicated between users and/or data communicated between users and application servers. Security measures, such as encryption and the like provided by several applications and/or servers, may be overlaid by some embodiments of the invention such that the security provided by an embodiment may be an augmentation of several security features of several applications and/or servers. For example, generated values 126 (e.g., points, or pairs of input and output values of a polynomial) may be communicated between computing devices 450 and 451 using communication channels, security and/or infrastructure provided by several applications and/or application servers such as application servers 440, 441 and 442.

For example, after randomly selecting a degree of a polynomial and randomly selecting a point of the polynomial, computing device 450 may send the point to computing device 451 using a first application and/or via a first server, e.g., as shown by arrows 460. For example, application server 440 may be a WhatsApp server, and computing device 450 may send a share or a point of a polynomial to computing device 451 using a WhatsApp message that may be encrypted by the WhatsApp application. Although not shown, in some embodiments or cases, an application message may be sent directly between nodes, e.g., a WhatsApp message that includes a point of a polynomial (or other generated value as described herein) may be encrypted by the WhatsApp application on computing device 450 and may be sent directly from computing device 450 to computing device 451. A second value, e.g., a generated value 127 or point for the polynomial as described may randomly selected and sent, e.g., from computing device 451 to computing device 450, using a second application or server as shown by arrows 461, a third value may be communicated using a third application as shown by arrows 462 and so on. Accordingly, secret shares, points or generated values 126 that may be used to authenticate devices and/or to secure a communication channel between devices (e.g., used for generating an encryption key as described) may be encrypted or otherwise secured by an overlay of security measures or methods provided by a plurality of applications, platforms and/or infrastructures.

Accordingly, the authenticity of a new device may be yielded from the authenticity of each of a set of already authenticated devices that directly communicate with the new device, and the corresponding authenticity level of the direct channel used by a device when directly communicating with the new device. The authentication level obtained implies also the secrecy level obtained following the establishment of a shared key between the sender and the new device.

It is noted that, as described, some embodiments of the invention may increase the security and/or authentication in a scale similar to PKI, where $O(n)$ entities establish trust and secrecy with (one or a few) certificate authority allowing the establishing $O(n^2)$ trusted and secure communication. For example, a set of users or devices (e.g., the set of devices 450 and 451) each having an already established secured link with an application or server (e.g., with applications supported by servers 440, 441 and 442) requires or produces $O(n)$ secured links, e.g., the $O(n)$ secured links or channels are created or established using security measures or layers imposed by applications such as Facebook or WhatsApp, for example, the $O(n)$ secured links may be secured by user passwords, data encryption, two-step-verification and/or various other techniques supported by servers and/or applications. By overlaying a set of secured layers as described, some embodiments of the invention may achieve a security between any two devices, namely, $O(n^2)$ secure overlay channels.

For example, using a Facebook secured connection and a WhatsApp secured connection to share two values that are then used for creating an encryption key as described benefits from the security provided by Facebook and from the security provided by WhatsApp. Accordingly, an embodiment may include establishing or sharing keys or other secrets between any two, previously not known to each other, entities where each of the entities has an independent secure link with an application, server or platform (e.g., Facebook, WhatsApp etc.). Using the O(n) secured links of these entities, an embodiment may create O(n^2) keys or secrets that may be sent over O(n^2) different channels or links thus increasing the opportunities of secure communication in the system. As the number of platforms grows, the possibility for a hacker or malicious entity to obtain keys or other secrets used for encrypting data is reduced dramatically. In addition, the platforms cannot store any meaningful information from the communication and cannot act as man-in-the-middle (MITM).

Some embodiments may address the challenge of securing client server communication and authentication. For example, some embodiments may enable both a client and a server to be identified and/or authenticated to each other and to further be securely connected through an entire communication session. For example, some embodiments may provide authentication that enables a server to guarantee or verify that it is communicating with the right client, e.g., not with an entity that stole the identity of the client (e.g., using identity theft as known in the art). Some embodiments may provide authentication that enables a client that it is indeed communicating with the right or intended server, e.g., eliminating or overcoming phishing attacks or man-in-the-middle (MITM) attacks. Some embodiments may provide privacy, e.g., by eliminating data in motion attacks. Some embodiments may provide security related to client approval or confirmation, e.g., approval of transactions.

As further described, some embodiments may be applicable to any computing device, e.g., mobile phones or other mobile devices, home or other computers, servers and the like. Some embodiments may require no change to existing computing devices, may easily integrate with existing environments, and may provide complete, foolproof protection against attacks such as MITM, phishing and data in motion attacks. Some embodiments use a secret sharing scheme for distributing a secret among multiple participants.

Figure 5:
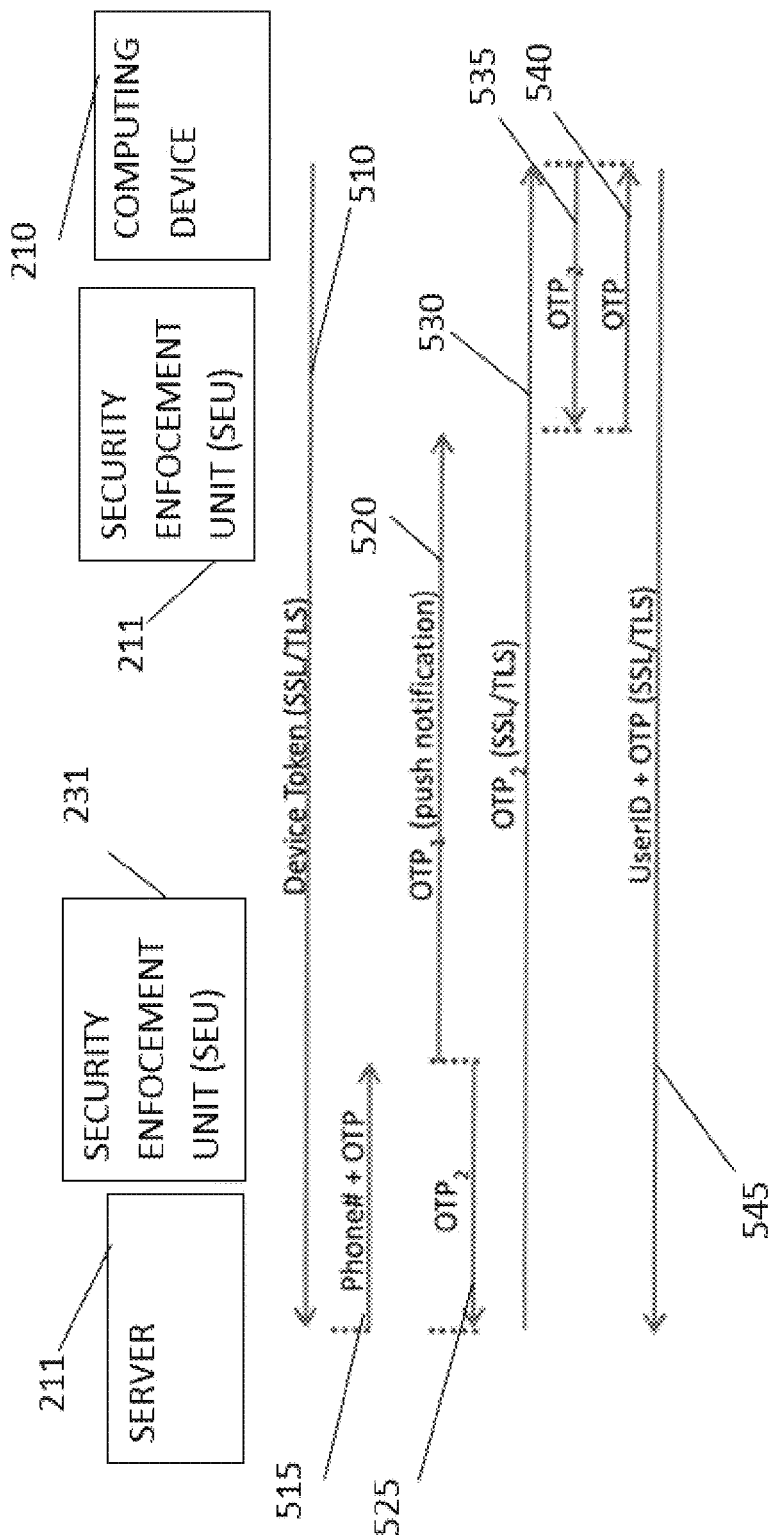
FIG. 5 shows a flowchart of a method according to illustrative embodiments of the present invention.

Reference is made to FIG. 5, a flowchart of a method according to illustrative embodiments of the present invention. As shown by arrow 510, a device token may be sent by a client to a server. A token as referred to herein may be any value, code, key or data object or digital information. For example, a token may be a unique value or number generated for a user or for a device. A token sent from computing device 210 to server 211 as shown by arrow 510 may be a token stored or included in a smart mobile device, e.g., a token obtained during a prior one-time enrollment process of the client to server 211, for example, a token, code, key or other data object received by device 210 in an SMS message, in an email, or obtained from a human agent. In some embodiments, the flow shown in FIG. 5 may be repeated or performed for each session between a client (e.g., a user of device 210) and a server (e.g., server 211). For example, each time a user of computing device 210 logs into server 211, a token or code is sent from device 210 to server 211 as shown by arrow 510 thus starting the flow shown in FIG. 5. The token may be a device token that is stored on device 210 (e.g., in configuration data 133) or it may be provided to device 210 before each login or periodically, e.g., a device token may be replace once a month.

In some embodiments, after server 211 receives a token from a device as shown by arrow 510, server 211 (or SEU 231) may randomly generate a one-time password (OTP). An OTP may be a password or another client certificate that may be used once (e.g., for one login) or it may be a password usable or valid for a limited time, e.g., an OTP may be valid or usable for the next hour or day. In some embodiments, SEU 231 in server 211 may use secret sharing or any other method to create, based on the generated OTP, (at least) two new shares, values or codes denoted in FIG. 5 as OTP1 and OTP2. For example, OTP1 and OTP2 may be similar to generated values 126 described herein.

As shown by arrow 520, OTP1 (one of the shares or values created based on the OTP) may be sent, over a first communication channel, to device 210. For example, OTP1 may be sent, from server 211 to device 210 using, or over, a network connection (e.g., an SSL connection) or using a push notification channel scheme or method. It will be understood that other communication channels may be used to send OTP1 to device 210 as shown by arrow 520.

As shown by arrow 525, OTP2 (the second share created based on the OTP) may be provided to server 211 (e.g., by SEU 231) and, as shown by arrow 530, OTP2 may be sent, using a second communication channel, to device 210. It is noted that, in some embodiments, the channel, route or link used for sending OTP2 is different from the channel, route or link used for sending OTP1. For example, OTP1 may be sent over a wireless network, and OTP2 may be sent over a wired network. For example, to send OTP1 and OTP2, two different in-band channels may be used, two different out-of-band channels may be used, or one in-band and one out-of-band channels may be used such that OTP1 is sent over a first channel and OTP2 is sent over a second, different channel.

As shown by arrow 535, computing device 210 may provide the received OTP2 to SEU 211 and, using OTP1 (received as shown by arrow 520) and OTP2, SEU 211 may construct the OTP. Accordingly, a state where both SEU 231 and SEU 211 (or both server 211 and computing device 210) have the OTP (which, as described, may be a randomly generated password or value) is achieved.

As shown by arrow 540, SEU 211 may provide computing device 210 with the OTP and, as shown by arrow 545, a user may login to server 211 using his or her name, a password or other credentials and the OTP. For example, to login to server 211, the user may send his or her user ID, password and the OTP over an SSL communication channel to server 211 as shown by arrow 545. At server 211, the OTP received from computing device 210 and other credentials of the user may be checked and, if a match is found, the login may be authorized or permitted.

In some embodiments, instead of, or in addition to, sharing an OTP as described, an encryption key may be shared. For example, a flow similar to the flow shown in FIG. 5 may be performed where, instead of an OTP, an encryption key is randomly generated and shares or values similar to OTP1 and OTP2 but generated based on the encryption key may be used to reconstruct the encryption key by computing device 210, thus achieving a state where both server 211 and computing device 210 have and use the same encryption key for encrypting data exchanged between server 211 and computing device 210.

Figure 6:
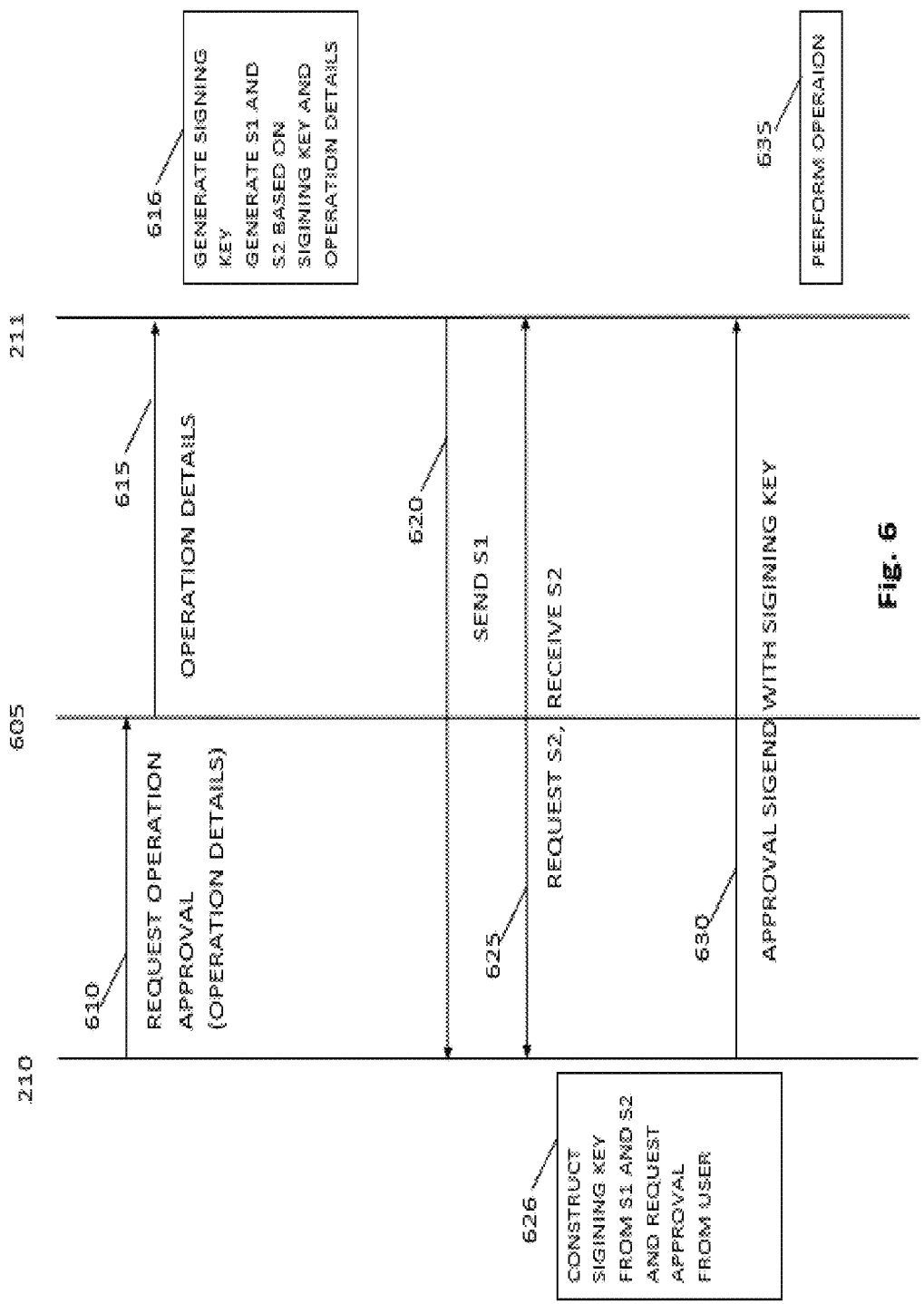
FIG. 6 shows a flowchart of a method according to illustrative embodiments of the present invention.

In some embodiments, a transaction or other operation may be securely approved. Reference is made to FIG. 6, a flow chart of a method according to illustrative embodiments of the present invention. As further described, in some embodiments, the flow shown in FIG. 6 may be performed by, or may include, computing device 210, a node 605 and server 211, and in other embodiments, two devices, e.g., node 605 and server 211, may perform the flow.

As shown by arrow 610, a request to approve an operation may be generated and sent, e.g., by computing device 210 (that may be a smartphone or a home computer), and based on input from a user. For example, the requested approval for an operation may be, or may include, a request to approve a transaction, e.g., a request to approve transfer of money from a user's bank account to some other account. As shown, the request for approval may include operation details, e.g., the sum to be transferred, a location of the user, a bank account number, user credentials and the like.

As shown by arrow 615, the request and the details may be sent to server 211. For example, node 605 may be a server of a bank to which a user may connect using computing device 210, and, upon receiving the request, the bank server may forward the request and the details to server 211. In some embodiments, node 605 may be an automated teller machine (ATM) or other computing device that may include an SEU as described herein, and accordingly, the flow may be performed without participation of computing device 210.

As shown by block 616, using, or based on, the request details, server 211 may randomly generate a signing key and may generate two shares or values (S1 and S2) based on the signing key and based on the operation details. Shares or values S1 and S2 may be, or may include, any digital object or data, e.g., shares or values S1 and S2 may be similar to generated values 126. It is noted that, by randomly generating the signing key, an embodiment may assure that the signing key cannot be predicted by any third party or entity.

As shown by arrow 620, a first value, e.g., S1, may be sent to computing device 210. Any communication channel or method may be used for sending S1 as shown by arrow 620; for example, in some embodiments, S1 may be sent using a push service as known in the art, or S1 may be sent in an SMS message. As described, in some embodiments, S1 may be sent to node 605.

As shown by arrow 625, computing device 210 may, after receiving S1, request server 211 to send S2, and server 211 may send S2, to computing device 210. As described, in some embodiments, node 605 may, after receiving S1, request server 211 to send S2, and server 211 may send S2, to node 605. In some embodiments, the communication channel, method, infrastructure, route or link used for sending S2 is different from the communication channel, method, infrastructure, route or link used for sending S1, and accordingly, no device, network node or entity may obtain both S1 and S2. Any communication channel or method may be used for sending S2 as shown by arrow 625; for example, in some embodiments, S2 may be sent over a secured SSL or TLS connection.

As shown by block 626, using S1 and S2, computing device (e.g., SEU 211) may construct the signing key and possibly the operation details. It is noted that, since S1 and S2 are created based on the signing key and the requested operation, S1 and S2 may be used for reconstructing the signing key and the requested operation. As shown by block 626, a user may be prompted or requested to approve or confirm the operation, e.g., confirm or approve a transaction.

As shown by arrow 630, based on input from a user, an approval to perform the operation may be sent to server 211 with, or signed by, the signing key. If an approval to perform an operation signed by the signing key is received by server 211, then server 211 may perform the operation, e.g., perform a transaction or other operation as shown by block 635.

As described, in some embodiments or configurations, the flow shown in FIG. 6 may be performed by node 605 and server 211 that may be a server of a bank, e.g., operations performed by computing device 210 as described herein may be performed by node 605. For example, node 605 may be an ATM that includes an SEU, and, when the user uses the ATM get money from his or her account, the ATM may prompt the user to provide details and may send details as shown by arrow 615, the ATM may receive S1 as shown by arrow 620, the ATM may request and receive S2, the ATM (or the SEU included therein) may reconstruct the signing key, the ATM may present, on its screen, details of the requested withdrawal and prompt the user to confirm or approve the withdrawal, and the ATM may sign an approval with the signing key and send the signed approval to server 211 as shown by arrow 630.

Although FIG. 6 and related text describe using two values, shares or generated values (S1 and S2) other embodiments, flows or configurations may be contemplated, e.g., more than two shares or generated values may be used. For example, in some embodiments, a first value may be obtained by a user (or by device 210) from the node 605, e.g., by scanning a code printed on, or displayed by, an ATM, and the ATM may send the code to server 230, and thus a first value or share may be provided to computing device 210 and to server 230. A second value, share or generated value, e.g., S1, may be sent using push notification from server 230 to computing device 210, and a third value, e.g., S2, may be sent over a different communication channel, e.g., over an SSL or TLS connection from server 230 to computing device 210. The signing key may be reconstructed using the three values. Any other number of shares may be used, e.g., as described herein.

Although only two values (S1 and S2) are shown in FIG. 6, it will be noted that any number of values may be generated based on details of an operation or transaction, such that any information (e.g., textual strings, amounts and the like) may be used for a secured approval. For example, operation details sent as shown by arrow 615 may include a location of node 605 (e.g., the ATM) used as described, e.g., operation details may include the string "main street 317". Server 211 may construct a first pair of S1 and S2 that encodes or represents the character "m" (first character of the location), and may send S1 over a first channel and send S2 over a second, different channel. Next, server 211 may construct a second pair of S1 and S2 that encodes or represents the character "a" (second character of the location), and may send S1 over a first channel and send S2 over a second, different channel and so on.

Reconstructing data communicated using pairs of S1 and S2 values, the receiving end (e.g., computing device 210 or node 605) may present information such as location to a user, thus enabling enhanced security measures, e.g., in requesting approval from a user, node 605 (e.g., an ATM) may present, on a screen "Are you withdrawing $150 from an ATM at 317 Main Street?" and may proceed to approve or cancel the transaction based on a response from the user.

Of course, any other number of values such as S1 and S2 may be used for representing data, e.g., a character, a sum of withdrawal or other data may be represented or encoded using any number of Si values, e.g., three values S1, S2 and S3. For example, a character or sum may be (or may be determined based on) the free coefficient of a polynomial $p(x)$ of degree k as described herein and the number of values Si used for communicating the character or sum may be k+1 as described.

Some embodiments of the invention may address the challenge of enrollment, registration or enlistment. As known in the art, a hacker or other malicious entity may use data provided in the process of enrollment to register or enroll to a server, service or application. In some embodiments, an enrollment process, method or flow may include providing a key to an entity to be enrolled. For example, an administrator in an organization sends a key, e.g., in an email, to a new employee. An embodiment may include providing the key to a server or other enrollment management entity. For example, the administrator may send the key to a server of the organization. In some embodiments, user information may be sent to the server. For example, the name of the new employee or any other information identifying and/or known to a user that is to enroll with a server may be provided to the server, e.g., by an administrator. The key provided to a user or to an entity that is to enroll may be used as a known value 127 as described herein. For example, after the server and user have the key (a first value) as described, the server may randomly select any number of additional values (e.g., second and third values) and send the additional values to the user or enrolling entity, e.g., a second value may be sent using push and a third value may be sent over an SSL connection. In some embodiments, a randomly selected value may be sent over a communication channel that is different from the communication channel used for sending the key from the enrolling entity to the server. In some embodiments, both the server and the enrolling entity may use the key and randomly selected values to generate a value that may be used for enrollment and/or for encryption of data. For example, based on the key provided to a server and to a user (or an enrolling entity) and based on randomly selected values as described, the server and the enrolling entity may generate an enrollment key, token, code or value. The enrolling entity may send the enrollment key, token, code or value to the server and the server may verify the enrolling entity based on the enrollment key.

A number of trusted (e.g., already or previously enrolled) entities, devices or users may be used, by an embodiment, to enroll a new user. For example, a first value described above may be sent to the new employee via a first employee who previously enrolled with a server or service, a second value may be sent to the new employee via a second employee and so on. In other cases, a set of values may be provided to a user using family members, e.g., a first value may be provided to a user via her husband, a second value may be provided by a child of the user, and so on. Accordingly, in order to enroll a user, an embodiment may send to or share with the user a set of values or shares that may be used together to generate a key, code, token or value that may, in turn, be used for verifying and/or enrolling the user.

Some embodiments of the invention may include identifying an entity. For example, an entity identified as described herein may be a new employee in an organization that needs to be identified to, or verified by, a server in the organization, or the new employee may be required to be identified, authenticated or verified to, or by, any identifying entity. Identifying an entity (e.g., a person or device) may be performed as part of an enrollment or registration procedure, e.g., as part of an enrollment to a service, organization or platform. For example, an identifying entity may be a server, platform, service and/or application of an organization and the identifying entity may identify, authenticate or verify a new employee, device or any entity that needs to be identified, e.g., prior to being granted access to resources of the organization. For example, an identifying entity may be a mail server of an organization that may identify (and/or authenticate, or verify the identity of) a new employee prior to granting the new employee access to mail, or an identifying entity may be an access point in a network of the organization that may identify (and/or authenticate, or verify the identity of) a new employee prior to granting the new employee access to the organization's network.

Figure 7:
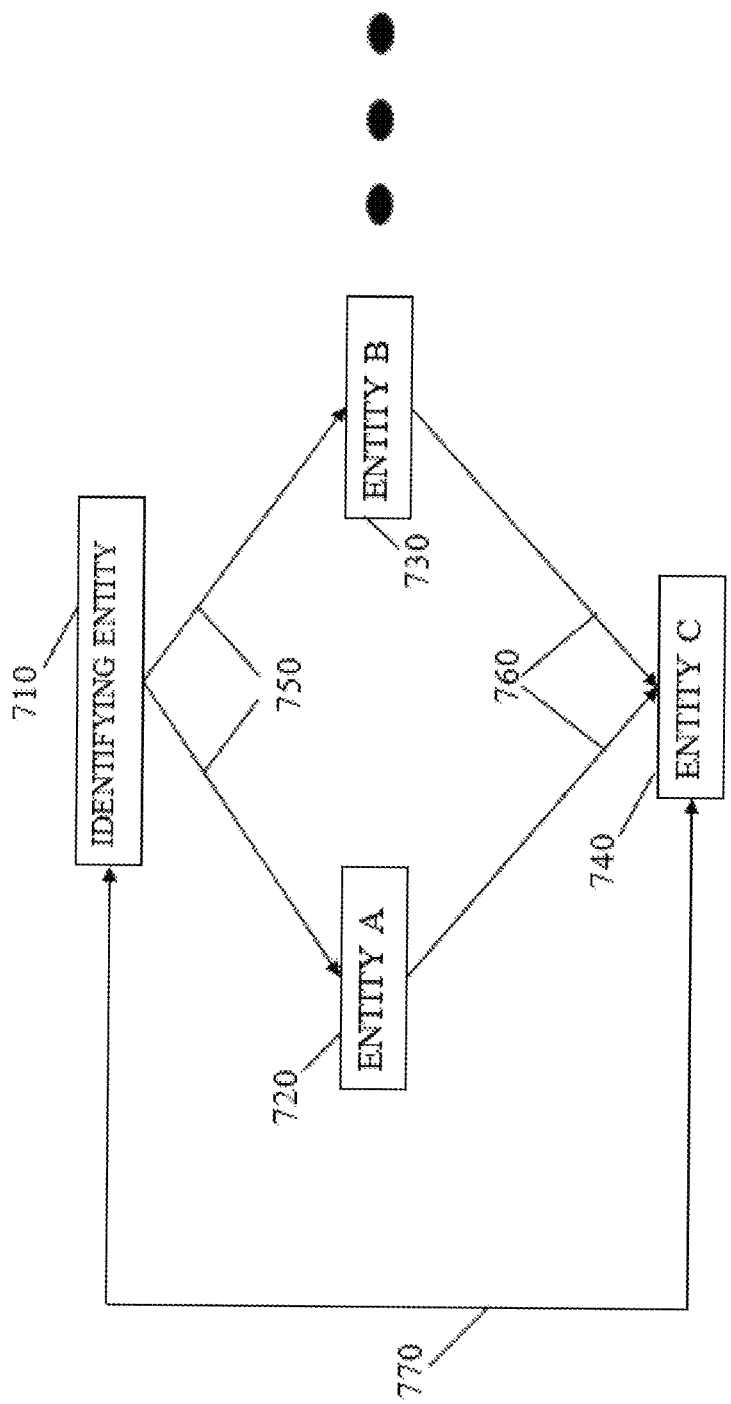
FIG. 7 shows a flow chart of a method according to illustrative embodiments of the present invention.

Reference is made to FIG. 7, showing a system and flows according to illustrative embodiments of the present invention. As shown by FIG. 7, a system may include an identifying entity 710 and a plurality of entities as shown by blocks 720, 730 and 740.

Generally, identifying entity 710 may be any entity that identifies, authenticates and/or verifies the identity of users, subscribers or other entities, for example, prior to allowing users or devices to access resources in an organization, bank or medical institute, identifying entity 710 may identify, authenticate or verify the identity of users or devices. For example, identifying entity 710 may be a server, service or application in an organization or institute. For example, identifying entity 710 may be an exchange or other mail server in an organization, or identifying entity 710 may be any other server, service or application of a bank or a medical institution. Identifying entity may be, or may include components of computing device 100, for example, identifying entity 710 may be a computing device similar to server 230.

Entity 740 may be an entity that needs to be identified, authenticated or verified. For example, entity 740 may be a device of a new employee in an organization, e.g., an employee (and/or device) that is yet unknown to, or unregistered with, identifying entity 710, or entity 740 may be a new device connected to an internal or other network of an organization, or entity 740 may be a new (yet unregistered) user, e.g., a new client of a bank and so on. Entities 720 and 730 may be any computing devices, e.g., computing devices like computing device 100. As described, entities 720 and 730 may receive values (e.g., generated values 126 or other secret values) from identifying entity 710 and send, forward or otherwise provide the values to entity 740, accordingly, entities 720 and 730 may be referred to herein as intermediate entities.

In some embodiments, in order to identify an entity (e.g., to identify a new or yet unknown or unregistered user or device), at least one of first and second values may be provided to a respective at least one of first and second devices. For example, identifying entity 710 may provide at least one of first and second values to at least one of entity 720 and entity 730. For example, a server (e.g., a server similar to server 230) in an organization may send a first value (e.g., a generated value 126 or secret value as described herein) to entity 720, and the server may send a second generated value 126 to entity 730. As further described, in some embodiments, in order to identify a new or yet unidentified entity, two or more values may be provided to the new entity via two or more already trusted entities, and in other embodiments, configurations or cases, one of the values may be provided to the new entity directly by the authentication entity.

A first and a second value may be used, by an entity, to identify itself, e.g., to an identifying entity. For example, entity 740 may use two or more values (provided to entity 740 as described herein) to generate a secret value that may be known to identifying entity 710, and, by providing the secret value to identifying entity 710 (and/or otherwise prove possession of a secret value or a set of values), entity 740 may identify itself to identifying entity 710 or be otherwise identified, authenticated or verified. Communicating values, e.g., between any or identifying entity 710, intermediate entities 720 and 730 and entity 740, may be done as described herein, e.g., over in-band and/or out-ofband channels, logical and/or physical channels etc. For example, two values sent to entity 740 as described herein may be sent using two different channels as described herein such that no entity other than entity 740 can obtain the two values.

In some embodiments, at least one of the first and second entities that were provided, by an identifying entity, with values as described, may provide the value to entity 740. For example, server 230 may provide a first value to a first computing device 210 (that may be entity 720) and further provide a second value to a second computing device 210 (that may be entity 730) and at least one of the computing devices 210 may provide (e.g., forward) the value provided by server 230 to a third computing device 210 (that may be entity 740), or to any other device that is to be identified. Entity 740 may use the at least one of the first and second values to identify itself to identifying entity 710. For example, entity 740 may identify itself to identifying entity 710 by sending, to identifying entity 710, one, two or any other number of values it received from entities such as entities 720 and 730.

It will be noted that, although, for the sake of simplicity, only at least two intermediate devices are described herein, any number of intermediate devices may be used for providing any number of values that may be used for identifying a new entity. For example, to increase any of: security; resilience and/or fault tolerance, five values may be sent, by authentication entity 710 to entity 740 via five or less intermediate entities such as entities 720 and 730. For example, for redundancy, the same value may be sent via two different nodes or entities on a network such that, if one of the values is lost, authentication may still succeed. In some embodiments, in order to increase redundancy or resilience of a system, a subset of values from a set of values sent to an entity that is be identified may suffice to authenticate the entity. For example, identifying entity 710 may send three values (to be forwarded to entity 740) to three nodes, users, devices or entities such as entities 720 and 730 where two of the three values may be enough for identifying entity 740. For example, two points out of three points on a curve of a polynomial of first degree may suffice to identify the polynomial, or, in another example, entity 740 may be identified based on a concatenation of any two values out of three values.

It is noted that the more values (and the more intermediate nodes or entities) used, the more secure a system may be since, the larger number of values and/or the number intermediate nodes or entities) used, the harder it is for a hacker to obtain all of the values and, as described, all of the values may be required to share a secret between entities. In some embodiments, a secret may be used for identifying an entity, e.g., using values received from entities 720 and 730, entity 740 may discover a secret (e.g., using a polynomial as described herein), and entity 740 may identify (or verify or authenticate) itself to authentication entity 710 by providing, or otherwise using the secret.

Accordingly, an embodiment may securely and positively identify a new, or previously unknown, or yet unidentified entity by providing or sending one or more values to intermediate entities, users or devices, have the intermediate entities provide, send or forward the values to the new entity that is to be identified and identify the new entity based on receiving, from the new entity, the values sent to the intermediate entities.

In some embodiments, a first and a second device may be identified, by an identifying entity, prior to providing the at least a first and second values to the first and second devices. For example, entities 720 and 730 may be identified or authenticated by identifying entity 710 prior to providing them with values as described. For example, prior to providing entities 720 and 730 with values as described, identifying entity 710 may authenticate entities 720 and 730 e.g., by establishing a secured communication channel between identifying entity 710 and each of entities 720 and 730, e.g., using secret values 128, known values 127 and/or generated values 126 as described herein. It will be noted that any method may be used to make entities 720 and 730 (or other intermediate entities) trusted or identified by identifying entity 710. For example, an administrator may configure identifying entity 710 to know or trust entities 720 and 730, or entities 720 and 730 may be identified or verified, and accordingly, it will be recognized that the scope of the invention is not limited by the system or method used for authenticating or verifying entities 720 and 730. In some embodiments, instead of, or in addition to, identifying a first and a second devices prior to providing the at least first and second values to the first and second devices, a channel known to be secured may be used. For example, a secured channel (e.g., WhatsApp) may be used by identifying entity 710 to provide the first and second values to entities 720 and 730 as described.

In some embodiments, prior to providing a new entity (e.g., entity 740) with values received from an identifying entity, an entity (e.g., entities 720 and/or 730) may identify the new entity. For example, prior to providing entity 740 (that may be the new, unknown, unverified or unauthenticated) with values received from identifying entity 710, entities 720 and/or 730 may identify, authenticate or verify entity 740. For example, an administrator or user may configure entities 720 and/or 730 to know or trust entity 740 or entities 720 and/or 730 may identify or authenticate entity 740, prior to providing it with values received identifying entity 710, using a secured communication channel, generated, known and secret values as described herein. In some embodiments, prior to providing entity 740 with values as described, entities 720 and/or 730 may identify, validate or authenticate entity 740 as described herein, for example, using secret sharing and/or by establishing a secured communication channel with entity 740 as described herein (e.g., the way an SEU in device 310 authenticates the washing machine in the above washing machine example).

In some embodiments, instead of, or in addition to, identifying a new entity (e.g., entity 740) prior to providing the new entity with values received from an identifying entity, a channel known to be secured may be used. For example, a secured channel (e.g., WhatsApp) may be used by entities 720 and/or 730 to send values received from identifying entity 710 to entity 740.

Accordingly, an embodiment may build a chain of trust; for example, based on a trust between entity 730 and entity 740 or an authentication of entity 740 to entity 730, a trust between authentication entity 710 and entity 740 is established. For example, once entity 740 is trusted or authenticated as described, a trust between entity 740 and a new device (not shown in FIG. 7) may be used to establish a trust between authentication entity 710 and the new device.

The advantage of using trusted devices and a trust between the trusted devices and new devices may be readily appreciated as it enables embodiments of the invention to add untrusted (or yet unauthenticated) devices using already trusted or authenticated devices. For example, if device A trusts device B (e.g., entity 710 trusts entity 730), and device B trusts device C (e.g., entity 730 trusts entity 740), then, using a method as described herein, device A can establish a trust of device C using the trust between device B and device C. Unlike known systems and methods that require an authentication entity to establish a trust with a new entity by directly communicating with the new entity, using a chain of trust as described, some embodiments of the invention may establish a trust with a new entity using previously established trust, e.g., a trust of devices that act as intermediate entities as described. It is possible that a network of trust will be constructed and updated with every new identification, possibly with feedbacks concerning false identifications. Such a network of trust can have independent applications, such as credit ranking.

Accordingly, some embodiments of the invention may provide or enable security of a system that may be built or accomplished in steps or phases where each step or phase benefits from the security established or guaranteed by the previous step, e.g., based on a security, trust or verification between entities 720 and/or 730 and entity 740, a security, identification or trust between identifying entity 710 and entity 740 may be achieved. For example, entities 720 and 730 may be known, trusted and/or identified employees in an organization, and the trust in these employees may be used to identify, and/or establish a trust of, a new employee (or employee's device) 740.

It is noted that any number of intermediate entities such as entities 720 and 730 may be included in a system or method according to some embodiments of the invention. In some embodiments, a single intermediate entity may be used. For example, in some embodiments, identifying entity 710 may send or provide a first secret value to entity 720 and may send a second value directly to entity 740. Entity 740 may use the two values (e.g., one received from identifying entity 710 and one received from entity 720) to identify itself to identifying entity 710, e.g., as described.

In some embodiments, based on identifying an entity, one or more actions or procedures may be performed, enabled or allowed. For example, any one of registering, enlisting and enrolling an entity with at least one of: a network, a platform, a server, a service and an application may be performed, enabled or allowed if, or after, an entity is identified. For example, after entity 740 is identified to or by identifying entity 710, entity 740 may be registered in or by services, platforms or services in an organization and/or entity 740 may be granted access to resources and the like. For example, if entity 740 is a new employee of an organization (or a device of the new employee), then, following an identification of entity 740 as described, the employee or device may be granted access to resources of or in the organization, e.g., printers, databases and services such as mail and the like.

Establishing trust concerning an identity is a challenge faced by the industry. For example, before transferring money to a bank account, it may be desirable, required or necessary to verify the identity of the person and/or verify that the bank account is indeed owned by the identified person. Known certification authorities, systems and methods use keys or other credentials and a central authentication or certification authority or entity, and, accordingly, known systems suffer from a number of drawbacks, e.g., these systems are centralized and therefore do not scale easily and, using keys, these known systems are vulnerable, e.g., they can be hacked by stealing, guessing or otherwise obtaining a key. In particular, the key used for signing certificates is a single point of failure that, when stolen, immediately nullifies the trust in all issued certificates and, therefore, is an obvious target for hackers.

Some embodiments of the invention may include (or enable) a distributed and keyless authentication, identification and/or verification of an entity. The authentication and identification maybe based on maintained, partially public enriched phone book(s), in the form of partially public (verified) record of contact lists, including not only the name, address and phone(s) numbers but also email, messengers and other means for communicating with the entity. The contact book(s) may be maintained by one or more trusted entities. For example, in some embodiments, a certification system or method may be keyless in the sense that no keys (or other credentials) are kept, communicated or even required to authenticate or verify a user, device or any other entity. Additionally, or alternatively, an embodiment may include a distributed certification or verification system and/or method.

As further described, an embodiment may include or enable establishing trust concerning an identity of an entity by the implementation of a distributed ledger or record of entity details, possibly based on block-chain and/or distributed-ledger technology, either with or without using consensus. In some embodiments, a trust in an identity of an entity may be based on an accumulation of trust in one or more nodes (or entities) that may collaborate to create a distributed ledger.

As described, an embodiment may include a ledger that may include records of users where a record of a user may include entity details. Entity details as referred to herein may include any information related to an entity.

For example, entity details may be, or may include, any information related to a presence of a user or entity in the cloud; for example, entity details may include an address of a cloud avatar of a user or any other details related to cloud based platforms, e.g., user name and password for Microsoft OneDrive, Dropbox, GitHub and the like. Entity details in a record or ledger may include a photo of a person, a photo of (possibly approved) official documents, a business license, a driving license, a passport, a serial number, a purchase document, contact information, an address, any biometric data (e.g., fingerprints or retinal scan), a phone number, an email address, a messenger addresses, a social network identity (e.g., details in Facebook, LinkedIn, Skype etc.), a credit history certificate and the like. For example, entity details for a person may include one or more of a birth/governmental certificate, school certificates, address certificate, passport, driving license, bank accounts, biometric details, contact list and personal events (e.g., collected from Facebook timeline). Entity details for an organization may include governmental certificate in creation, quarter/annual reports (accounting, special events), contact list (phone, emails, messengers, social networks) persons associate with the organization. Entity details for servers, machines or device such as smartphones may include a serial number registered by manufacturer, electronic fingerprints, history of purchases and locations, inventory lists, contact list including an internet protocol (IP) address or a media access control (MAC) address, geographic information. Entity details for IoT devices may include a serial number registered by manufacturer, electronic fingerprints, history of purchases and locations, Hub(s) connected to, inventory list, contact list including IP addresses, MAC address, Geographic Information Systems, Network Management Systems.

The term ledger as referred to herein may relate to any set of entity details, e.g., a record, file or any other construct or object that includes entity details as described herein. For example, a ledger may include entity details such as a user's name, user's phone number, user's address and so on. A ledger may be related to any entity. For example, if the entity is a device, then a ledger may include entity details such as a network address of the device, e.g., an IP address or a MAC address. In yet another case, when the entity is an organization, then a ledger may include entity details such as a business address, business fax number and so on.

Figure 8:
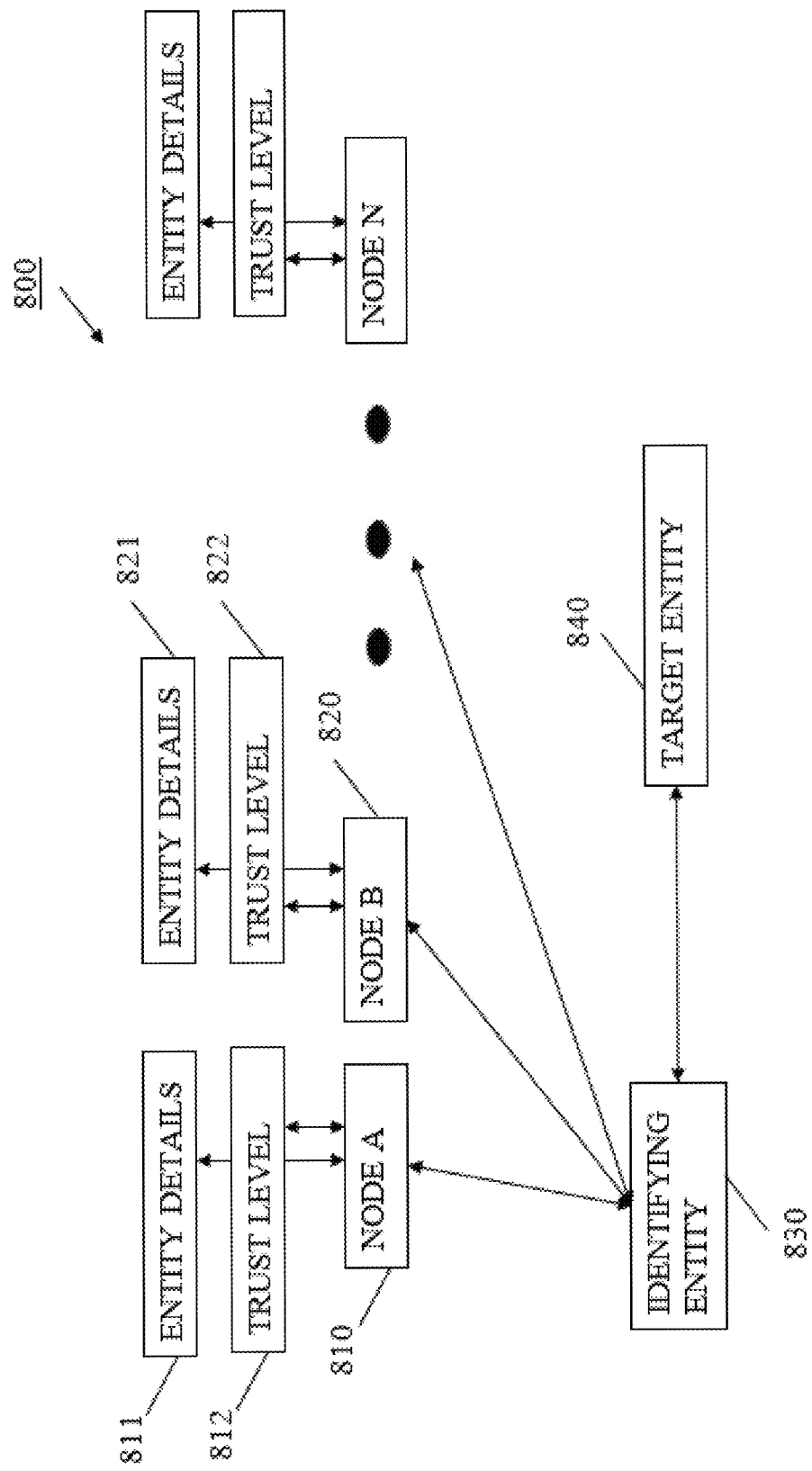
FIG. 8 shows a system and flows according to illustrative embodiments of the present invention.

Reference is made to FIG. 8, a system 800 and flows according to illustrative embodiments of the present invention. As shown, system 800 may include any (possibly large) number of entities (also referred to herein as nodes) that may each store, keep or otherwise include entity details of an entity and a trust level for each detail of the contact record for the entity. A trust level as referred to herein may be any value, score, or confidence level that reflects or indicates a level of trust in an identity of an entity. For example, a scale of one to ten (1-10) may be used where a trust level of one (1) may indicate lack of trust while a trust level of ten (10) may indicate, represent or reflect that an identity of an entity is verified, authenticated or determined with a high level of confidence or trust.

For example, a system may include node 810 that may be a bank (e.g., a server in the bank), node 820 that may be a user device (e.g., computing device 210) and so on. As shown, a large number of nodes may be included in a system, e.g., a system may include a plurality of nodes similar to nodes 810 and 820, that may be, for example, government agencies, organizations, attorneys, notaries, credit history agencies, nodes or servers in a social network, or edge-devices such as smartphones, persons, server-machines, IoT devices or any other entity or node. For the sake of simplicity and clarity, two nodes (nodes 810 and 820) will mainly be discussed herein; however, it will be understood that any number of nodes may be included in an embodiment as described herein.

As shown, a system may include an identifying entity 830. Identifying entity 830 may be any entity, user or device that wishes to identify, authenticate, validate or otherwise establish a trust in the identity of target entity 840. Target entity 840 may be any applicable entity, e.g., a person, a device, an organization or any other entity for which a trust is required or sought. For example, identifying entity 830 may be a bank that wants to validate or verify the identity of target entity that may be a user, e.g., prior to completing a transaction of money to a bank account of a user based on data in a transaction request, the bank (the identifying entity) may want to verify or ascertain that the user indicated in the transaction data (the target entity) is indeed the user who owns the indicated account.

As shown, each of the (identity contact list maintaining) nodes may keep, store or include entity details and a trust level related to each detail in the contact record of the target entity. For example, assuming target entity 840 is a person, entity details 811 may include, for example, the phone number of that person as known to node 810 that may be a bank, and entity details 821 may include, for example, the home address of that person as known to node 820 that may be a medical institution. As further shown, each node may keep, store or include a trust level. For example, trust level 812 may be a number between zero and ten (0-10) that reflects or indicates the level of trust that node 810 has in the identity of target entity 840, and trust level 822 may be (possibly another) number or value that reflects or indicates the level of trust that node 820 has in the identity of target entity 840.

For the sake of clarity, only a single trust level per node is shown; however, any number of trust levels, scores or values may be associated, by each node, with an entity. For example, each element or entry in entity details 811 may be associated or assigned with a trust level, and trust level 812 may be calculated based on a set of trust levels. For example, assuming target entity is a person, entity details 811 may include the name and photo of the person with a trust link level of ten (10), e.g., reflecting a high confidence or trust level in the name since the person showed, to a clerk in a bank, an identifying card with his name and picture, and entity details 811 may include the phone number of the person with a trust level of five (5), e.g., since the phone number was obtained from a (trusted or semi-trusted) third party and was never verified. Any method may be used to calculate or determine a trust level (e.g., trust level 812) based on a set of trust levels of an entity. For example, referring to the above example, a trust level of ten in a name and five in a phone number may, e.g., based on an average, weighted average or other methods, yield a trust level of seven and half.

A embodiment may include validating an entity by obtaining, by at least one or first node or system (e.g., node 810), a set of entity details related to the entity, for example, a set of entity details related to target entity 840 as shown by entity details 811. An embodiment may include associating with the entity, by the first system or node, a respective first trust level based on at least some of the entity details. For example and as described, trust level 812 may be a trust level associated, by node 810, with target entity 840. An embodiment may include validating the entity based on the trust level. For example, to validate target entity 840, identifying entity 830 may receive, from node 810, entity details 811 and trust level 812 and may validate target entity 840 based on the entity details and the trust level. Validating an entity may be done based on entity details and trust levels from any number of nodes as further described herein. It will be understood that any method or flow for validating an entity as described herein may be performed based on, or by a collaboration of any number of nodes, e.g., nodes 810, 820 and/or any N nodes as shown by FIG. 8.

Some embodiments may include validating an entity by obtaining, by at least first and second entities, nodes or systems (e.g., nodes 810 and 820), a set of entity details related to the entity, for example, a set of entity details related to target entity 840 as shown by entity details 811 and 821. An embodiment may include associating with the entity, by the first and second systems or nodes, a respective first and second trust levels based on at least some of the entity details. For example and as described, trust levels 812 and 822 may be trust levels associated with target entity 840. An embodiment may include validating the entity based on the at least first and second trust levels. For example, to validate target entity 840, identifying entity 830 may receive, from nodes 810 and 820, entity details 811 and 821 and trust levels 812 and 822 and may validate target entity 840 based on the entity details and the trust levels.

For example, assuming target entity 840 is a person who identifies himself to another person (identifying entity 830) as John Brown, living at 17 Main Street and owning or using phone number 201-555-4444. In order to verify or validate the information provided by the person, identifying entity 830 may contact nodes 810 and 820 and query them regarding this person. Each of nodes 810 and 820 may return a set of details, e.g., name, address and phone number and a trust level that reflects the level of trust associated with the details. As described, the trust level returned by nodes 810 and 820 may be a single, global number or value, and/or it may include a set of values that reflect or represent a trust level of specific details. Based on the data returned by nodes 810 and 820, identifying entity 830 may determine or decide whether or not the person is indeed John Brown from 17 Main Street with phone number 201-555-4444. For example, if both nodes 810 and 820 inform identifying entity 830 that the above details of John Brown are associated with a high trust level or value, then identifying entity 830 may determine that John Brown is validated, verified or authenticated. However, if the trust level of John Brown's details is low, either by one of nodes 810 and 820 or by combining the trust levels from nodes 810 and 820, then identifying entity 830 may determine that the identity of John Brown is not validated and may, for example, refuse to complete a transaction or perform any other operation that may be contingent on a validation of John Brown's identity. For example, nodes 810 and 820 may be two banks, and, before performing a transaction for a customer, identifying entity 830 (that may be a third bank) may validate the customer with banks 810 and 820 as described.

It is noted that the verification as described herein may be performed and/or achieved without using any keys or credentials provided by the target entity and/or without any centralized authentication, certification or registration authority. It is further noted that the level of trust may be increased as more and more nodes such as nodes 810 and 820 participate in a validation process as described, and, for example, dozens of nodes that keep entity details may be queried as described and any threshold may be set such that, only if sufficient nodes identify target entity 840 with sufficient trust level, then target entity 840 is validated.

In some embodiments, a record or ledger may be created for an entity by including entity details in the record or ledger and the record or ledger may be provided to one or more nodes. For example, identifying entity 830 may be a server (e.g., server 230) that receives entity details, stores or includes the details in a record, file, ledger or any other construct and provides the record to nodes 810 and 820. Nodes 810 and 820 may each verify the details in a record, associate trust level scores to received details, and/or add details to a record. For example, if a record for target entity 840 received by node 810 from identifying entity 830 includes a phone number that is verified by node 810, then node 810 may associate a high trust score or level with the phone number. Nodes may add entity details to a record received as described. For example, if a record for target entity 840 received by node 810 from identifying entity 830 (and used for creating entity details 811) includes a phone number, a social security number and a name and but does not include a home address, and the home address is known to node 810 (e.g., stored in a database of node 810), then node 810 may add the home address to entity details 811. Accordingly, a record or ledger for an entity may be created or updated by any number of nodes.

In some embodiments, identifying entity 830 may periodically, or based on an event, timer or command, receive entity details from a plurality of nodes, update or create a record for an entity and distribute or redistribute the updated record to the plurality of nodes. For example, entity details that include the home address added to a record by node 810 as described may be sent to identifying entity 830, used for updating a record for target entity 840, and the updated record may be sent to node 820. Accordingly, updates of entity details from one node may be provided to other nodes, thus achieving an updated and distributed ledger or record for an entity.

In some embodiments, a distributed and keyless ledger or record authentication system or method may be realized or implemented using communication-less platforms, for example, any system or platform designed to provide fully-distributed applications or data by using the features and power of cloud technology without dedicated servers, as opposed to server-based platforms. Other techniques, platforms or methods used for implementing a ledger may be or may include global inventory, public directory and public contact book.

In some embodiments, a first set of trust levels may be associated with a respective set of entity details by a first system or node, a second set of trust levels may be associated with the set of entity details by a second node, and validating the entity may be based on the first and second sets of trust levels.

For example, node 810 may associate a home address of a person (target entity 840) with a trust level of ten (10) since mail sent to that address is known to have been received by the person, and node 820 may associate, with the home address, a trust level of zero (0), e.g., since this address was never used, or verified by node 820. Identifying entity may receive the sets of trust levels from nodes 810 and 820 and may use any logic to calculate a trust level in the home address and/or in the identity of the person. For example, thresholds, averaging, weights and the like may be used to determine whether or not an entity is validated, confirmed or verified based on trust levels received from a large number of nodes. For example, an entity may be considered validated or verified if none of the trust levels received from a plurality of nodes is below a threshold (e.g., below 6 out of 10), if the average trust level computed based on a plurality of trust levels is above a threshold trust level and so on.

In some embodiments, at least some of the entity details of an entity may include contact details, and an embodiment may select, based on a trust level, a first and second contact details, select, based on the first and second contact details, a respective first and second communication channels, and the embodiment may validate the entity by communicating with the entity over the first and second communication channels. In some embodiments, the first and second communication channels may be used to validate, authenticate or verify an entity as described herein, for example, by sending a first value (e.g., a generated value 126) over the first communication channel and sending a second value over the second, different communication channel, and the first and second values may be used as described herein to validate or authenticate an entity.

For example, node 810 may be an application server (e.g., application server 441) that may provide a first contact detail (e.g., a user name and address), and node 820 may be a server in a bank that may provide a second contact detail (e.g., a phone number or email address). The two communication channels used based on the details provided by nodes 810 and 820 may be in-band, out-of-band, logical or physical channels as described herein, and contacting an entity based on two or more channels may include establishing a secured communication channel with the entity, e.g., using secret sharing as described herein.

In some embodiments, elements, entries or portions of entity details may be time-stamped, and associating an entity with a trust level may be based on time-stamps of entity details. For example, some or even each of a phone number, an address, an email and the like in entity details 811 and 821 may include or be associated with one or more timestamps that may be, or may reflect, the time the detail was created or added to entity details, the time the detail was last checked or verified and the like. A trust level determined or calculated for an entity may be based on timestamps or age of entries or details in a record or ledger. For example, data in entity details 811 that was last verified less than a week ago may be ignored, or weights may be associated with data elements in entity details 811 and 821 such that, when calculating a trust level based on data or entries in entity details 811 and 821 as described, older entries carry more weight than new or fresh entries or data. Accordingly, a trust level may be calculated with respect to age of data related to an entity.

In some embodiments, a trust level may be dynamically or otherwise updated or modified. For example, an embodiment may calculate or recalculate a trust level periodically, continuously or based on an event, a timer expiration or based on a command. For example, nodes 810 and 820 may periodically check, verify or update details, entries or data in entity details 811 and 821 and may further recalculate trust levels 812 and 822. In some embodiments, a command, e.g., received from identifying entity 830 may cause nodes to recalculate a trust level. Accordingly, a trust level for an entity may be kept up to date such that the trust level adequately reflects any changes in details or data related to the entity.

In some embodiments, updating a ledger, record or entity details may be done by each node participating in a ledger implementation described herein. For example, any one of nodes 820 or 820 may identify, receive or determine a new detail of an identity or these nodes may determine that an existing detail was changed (e.g., a phone number of a person was changed), and the nodes 820 or 820 may update entity details 811 or 821 accordingly. Updating a record, ledger or entity details of an entity may be based on any input or event; for example, a registration procedure that may include physical verification, biometric check and the like, or an update of entity details may be based on a communication via one or more of the contact addresses in the entity details, possibly using secured communication channels and/or secret shares as described herein.

In some embodiments, a trust level may be associated with a registering entity. For example, in some embodiments, entity details related to a registering entity may be received, from the registering entity, and the entity details of the registering entity may be provided to one or more nodes (e.g., to nodes 810 and/or 820). The nodes provided with details of the registering entity may associate the registering entity with a trust level.

For example, a bank may register a user (e.g., target entity 840) and may provide nodes 810 and/or 820 with details identifying the bank. Nodes 810 and/or 820 may associate a trust level with the bank. For example, if the bank is known to, trusted and/or verified by node 810, then node 810 may associate a trust level of ten (10) with the bank, and, if the bank is not recognized or verified by node 820, then node 820 may associate a trust level of three (3) with the bank. A trust level of, or for, a registering entity may be determined or calculated based on a set of trust levels associated with the registering entity by any number of nodes. For example, identifying entity 830 may set, determine or calculate a trust level of a registering entity based on the trust levels for the entity received from nodes 810 and 820, e.g., using logic or methods similar to those used for calculating a trust level for an entity as described herein.

Accordingly, some embodiments of the invention may prevent false registration. For example, a malicious entity attempting to steal personal information from users may lure users to register for a service, based on a low trust level associated with the malicious entity (e.g., the server or application used by the malicious entity), some embodiments of the invention may warn the user that false registration is taking place.

In some embodiments, nodes may be provided with a reference or other information usable for verifying an entity. For example, identifying entity 830 may provide node 810 with a phone number, email address or any other data, information or reference that may be used, by node 810, to verify a person or other entity. For example, based on a request to verify a user, where the request includes a name and a phone number, identifying entity 830 may send the name and phone number to node 810 and request node 810 to verify that the phone number belongs to the user indicated by the provided name. For example, nodes 810 and 820 may be servers 440, 441, and thus node 810 may be able to verify a user name and messenger address of a Facebook user, node 820 may be able to verify a LinkedIn user, and so on. Accordingly, by including in a system and method a plurality of nodes related to a respective plurality of platforms, social networks, institutions and so on, an embodiment may verify users or entities based on a plurality of platforms, social networks, institutions and so on.

In some embodiments, a trust level of an entity may be based on input from the entity. For example, target entity 840 may be a person and identifying entity 830 may associate a trust level with the person based on information provided (e.g., personally, in the presence of) the person. For example, a person may visit the place where identifying entity 830 (e.g., a server) is located, provide his or her fingerprints or other identifying information and, based on the provided data, identifying entity 830 may update or set a trust level for the person and/or person's entity details. A trust level and/or entity details received directly or otherwise from an entity may be sent, provided or distributed to any number of nodes. For example, a trust level established based on data provided by a user as described may be sent, from identifying entity 830 to nodes 810 and 820 and nodes 810 and 820 may update their respective trust levels and entity details based on data received from identifying entity 830.

System 800 may be, or may include, a ledger based, distributed certification. Some embodiments may create, generate or issue a certificate or proof of identity to a user.

For example, when an entity (e.g., a person) requests a certificate or proof of identity from a ledger based, distributed certificate authority such as system 800, an embodiment may receive information from the person and may interact with the distributed ledger, possibly, referring ledger servers or nodes to the sources at which the information can be verified, e.g., links to the relevant records in the internet, until a new record with the identity of the entity is saved in (a quorum of) the distributed ledger.

For example, if or when a user requests a certification of his or her identity from identifying entity 830 or when a user registers with identifying entity 830, a unit (e.g., a unit similar to SEU 211 in a user's device or unit similar to SEU 231 in server 230) may collect information related to the user (e.g., any entity details as described), and the unit may send any collected or obtained entity details to nodes 810 and 820. Participants in a distributed certification ledger, e.g., nodes or servers in system 800 such as nodes 810 and 820 may each verify entity details received, e.g., by means that may include a physical visit of a person, establishing communication using secret sharing via different channels, third party trust, etc. and possibly grant a record, entity details or other data of the person with a trust level, score, or confidence level. Based on the scores or trust levels of a plurality of nodes, an embodiment, e.g., identifying entity 830, may grant or deny a certificate. For example, if a trust level (e.g., determined based on input from a plurality of nodes as described) for an entity requesting a certification is high, then identifying entity 830 may issue a certification for an entity, otherwise, e.g., the trust level is below a threshold, identifying entity 830 may inform the user that a certification cannot be provided.

An embodiment (e.g., identifying entity 830) may receive a request to search for (or validate) an entity and may send one or more details related to the searched entity to at least one of first and second systems or nodes. For example, identifying entity 830 may receive a request to search for, or validate an identity of a person where the request may include a name, address or other details and identifying entity 830 may send the details received to nodes 810 and 820. An embodiment may receive from the at least one of the first and second systems information including at least one of: an entity detail and a trust level related to the searched entity and the embodiment may respond, to the request, based on the information.

For example, after sending entity details of a person to nodes 810 and/or 820, identifying entity 830 may receive, from nodes 810 and/or 820, a trust level for the person and/or additional details of the person and, based on the received trust levels and data received, identifying entity 830 may determine whether or not the person was found by system 800 and/or whether or not the person is identified or validated. For example, if the person is found by one of nodes 810 or 820 (entity details that match those received from identifying entity 830 were found in a database of identity details in node 810), then that node may inform identifying entity 830 that the person was found and may send additional details for the person it found in its storage or additional details the node obtained using the details it received from identifying entity 830. In addition, each of the nodes may send to identifying entity 830 a trust level associated with the searched entity. Based on details and trust levels received from nodes in system 800, identifying entity 830 may determine whether or not the entity searched for was found, identified or verified. For example, averaging or other operations related to trust levels as well as threshold as described herein may be used, by identifying entity 830, in order to determine that a person was found and identified by system 800.

The benefits and advantages of a distributed search and validation of entities may be readily appreciated. For example, a client can search a distributed ledger (e.g., system 800) for a specific identity, possibly prior to executing a transaction in which the identity of the parties (the client and the identity holder) involved is important. During a search, one or more (possibly a majority) of the distributed ledger/quorum participants (e.g., nodes 810, 820 . . . N) may be independently contacted, and the relevant records (and trust levels), that fit the search parameters may be returned, the trust in the identification may be computed as a function of the trust in the answers from the plurality of nodes as described. A record of a searched entity may be provided, e.g., by identifying entity 830 in response to a request from a client where the record may include contact details that were provided by nodes in system 800 as described. Accordingly, provided with an initial set of details related to an entity (e.g., name and phone number) and based on details stored in a plurality of nodes, an embodiment may return a large set of details for the entity, e.g., contact information such as email address, Facebook account and the like. A client can then use contact details provided as described to send secure and authenticated messages to the searched party, e.g., by the use of secret sharing techniques as described in herein.

In some embodiments, the process of obtaining entity details (e.g., for a searched entity as described) from nodes and validating an entity as described may be automated. For example, a search engine included in nodes 810, 820 . . . N and/or in identifying entity 830 may search any server, database, service or application for information related to a searched entity and thus obtain entity details for a searched entity. A unit, e.g., included in identifying entity 830, may be adapted to communicate with at least one of the nodes or systems in system 800 (e.g., with nodes 810 and 820) and validate an entity. For example, a unit similar to SEU 231 may receive details and trust levels from nodes 810 and 820 and may calculate, based on the received trust levels, a trust level for an entity as described. In some embodiments, a software assistant included in identifying entity 830 and/or in nodes 810 and 820 may perform the verification procedures described herein, e.g., using an automatic and/or semi-automatic contact, authorization and behavioral profile list builder and verifier.

For example, automatic, multi-factor identification and rich-contact details construction may be achieved by search engine fusion results (including indications concerning access patterns that can be extracted from public data and/or the personal behavioral patterns and preferences that servers store) in public and private directories, social networks, government, and commercial entities is a proposed software application. A contact list or rich-contact details as described herein may facilitate the use of secret sharing and overlay security to establish multi-channel, multi-factor, identification, authentication, and secrecy as described herein.

As described, the need to identify a person, a company, or even a device in the IoT era in the information age may be facilitated, by some embodiments, by gathering information concerning the person/company/device, e.g., by nodes 810 and 820, from the internet and other official/non-official governmental/private lists and investigators, such as phone books, election lists, or specialized (on-line/off-line) investigation services.

In some embodiments, an automatic and/or semi-automatic contact, authorization and behavioral profile contact and identity record builder and verifier (e.g., included in identifying entity 830) may be an unsupervised (e.g., using capabilities such as face recognition in images) process or supervised, possibly presenting found photos or other-identifications details and their sources interacting with the owner or user of a rich-contacts data-base letting the owner or user choose the most probable details to be fused into a ledger, record or entity details as described herein. Any source may be accessed, e.g., by units in identifying entity 830 or nodes 810 and 820, that may use results of search engines such as google (images), Facebook, Linkedin, Skype presenting all relevant photos or other details to be selectively chosen for gathering reliable contact information. For example, identifying entity 830 may present to a user data found for the user, receive from the user an indication that the information is correct and/or that the information should be included in entity details for the user. After receiving a confirmation from a user that information found for the user is correct or approved, identifying entity 830 may include the information in entity details for the user and may distribute the entity details, e.g., by sending entity details to nodes 810 and 820. Accordingly, a distributed record may be established by updating a plurality of nodes.

In some embodiments, in order for a trust level to be determined, entity details obtained from a plurality of sources may be crossed checked. For example, a detail such as a phone number for an entity provided by node 810 may be compared with a phone number for the entity provided by node 820. Accordingly, a trust level for a detail may be set or updated based on cross checking the detail or based on the number of nodes or sources that confirm the detail. Verification of details related to an entity may include an active event driven verification of the details (e.g., contact information) may be performed, e.g., by identifying entity 830. For example, identifying entity 830 may contact an entity with secret sharing through several communication links, to verify that the entity is reached using the different physical (e.g., WiFi, Cellular, Bluetooth) or logical (e.g., VPNs, messaging service) communication paths to enable the entity to store personal information, such as password/token and personal questions in a record or contact list or to set or update the trust level or confidence in the identity of a user.

In some embodiments, verification of the obtained details may be a continuous or never ending process, where an automatic user record, entity details or contact list builder is periodically (and/or event driven on demand triggered) invoked to (re)gain confidence on details in the contact list.

In some embodiments, a device may be associated or linked with an entity based on receiving, from at least one node or system, a confirmation that a current activity of the entity is related to the device. For example, node 810 may be a Facebook server that may verify and confirm that a specific user is currently using a specific device to access his or her account in Facebook, and, based on such confirmation, identifying entity 830 may associate the specific user with the specific device, e.g., include details of the specific device in entity details of the user.

In some embodiments, at least some of the entity details of an entity may include contact details for contacting the entity over at least two platforms and, validating the entity may include contacting the entity using the at least at least two platforms. For example, entity details 821 may include credentials for a Facebook account (e.g., user name) and entity details 811 may include a phone number of the user. Using such contact information (possibly received from more than one node in a system), identifying entity 830 may, for example, contact the user using SMS (using the phone number received from node 810) and using the user's Facebook account (received from node 820).

In some embodiments, a verification of an entity or user or updating entity details of the entity may include linking the user to a (possibly new) device where contact details are kept by, or originate from, third parties (e.g., LinkedIn or Facebook) that may be used to identify a user. For example, a user may direct or allow the third parties to "testify" that they link his/her identity to a current activity on the new device, and an embodiment may augment the new device parameters into a record or entity details of the user. Mutual trust parameters among the third parties may be used to calculate a certainty or trust level for the user.

Privacy protection may be achieved by some embodiments by sending secret shared data with integrity checksum to a user. For example, a user or client that would like to identify herself/himself may present a random string (for certain fields that should be revealed) that when used in a particular fashion, say twice (e.g. concatenated) reveals the needed information and the fitting signature.

In current or known system and methods, enrollment of a device to a server is typically done by a user account that is known to the server, e.g. email account. Usually, there is some information that is sent to this account and the user has to type this information in the server application. The enrollment process is typically performed each time the user adds/changes a device. An attacker can use this enrollment process as a vulnerability and try to add another device to a specific user account and, by cracking its mail account, it can gain the needed information to successfully enroll its own device to the victim account.

In one embodiment of the invention, using an enrollment process as described, the first time a user enrolls with a server, the user logs in through the server application to his email account (or other identification account(s)), and, if this login is successful, the enrollment process is also completed successfully. Accordingly, the inconvenience of typing the data that is sent from the server is eliminated.

In some embodiments, in addition to a mail login, a user may be requested to login through several accounts in several nodes, e.g., through accounts in nodes 810 and 820 that may be LinkedIn or Facebook servers. Trust levels of the additional nodes as described may be used as input to an overall trust gained for the user or user's entity details as described. For example, identifying entity 830 may get tokens or credentials of the several user accounts and may ask the accounts servers, e.g. Facebook, to give it the details of the account owner. Identifying entity 830 may save the details of the user (e.g. the user id in the specific server) of its several accounts and when the user logins using another device, identifying entity 830 may ask or prompt the user to login through his or her accounts and identifying entity 830 may verify the details. Copies of the tokens or credentials may be saved in a distributed identity certificate authority (e.g., system 800), thus enhancing the trust in the identification of an entity.

In some embodiments, nodes in a system (e.g., nodes 810 and 820) may use consensus to establish common identity storage (e.g., removing obsolete information) and combined trust, upon a read/search/write event and/or periodically. In some embodiments, nodes (e.g., nodes 810 and 820) may periodically perform search for their identity to avoid identity theft, and may have (periodically, e.g., daily, monthly) search, read, write or update identity details or records. In some embodiments, a ledger (or identity-ledger) maybe implemented by the use of a distributed ledger based on block-chain technology such as Ethereum.

As described herein, to identify (or register or enroll) an entity, an embodiment may send one or more values to the entity via respective one or entities or devices. In some embodiments, the one or more entities or devices via which values are sent to the entity that is to be identified may be selected based on a distributed ledger as described herein. For example, identifying entity 710 may select entities 720 and 730 (for sending values to entity 740) based on entity details of entity 740. For example, a record (or entity details in a record) of entity 740 may include data and/or references to family members or friends (entities 720 and 730) of a user (entity 740) that can testify that the entity details of entity 740 are correct and/or that can be securely used to transfer values to entity 740. Accordingly, a method of identifying an entity as described herein may include selecting intermediate entities for transferring or providing values to the entity based on a distributed ledger as described herein.

Some embodiments of the invention may provide and/or enable a quantum safe secured communication infrastructure using a distributed ledger, authentication overlay techniques and secret sharing as described herein. In particular, embodiments that are not based on the unproven existence of one-way-function, that are computationally weak for quantum computers, such as discrete log and factorization, but are based on proven information theoretically secure methods and combinatorics. For example, a system and method that use a keyless authentication and/or identification scheme as described herein augmented by secret sharing and secure communication channels establishment techniques as described herein and further including identification of an entity using one or more intermediate nodes or entities as described may provide or enable an infrastructure that is secured to a degree that far exceeds any other or known infrastructure.

In some embodiments, a method, procedure or sequence of operations may include, or be related to, a registration of an entity, e.g., a registration to a service, an enrollment to a server or application and the like. A registration of an entity may include any one or more of creating, verifying, authenticating, validating and/or storing entity details or records.

For example, in some embodiments, to register or an entity, a set of semi-trusted nodes (e.g., one or more banks, social platforms and servers) may each, independently, verify the identity of the entity and grant a confidence level to a copy of at least some entity details of the entity that may be stored by the node. For example, identifying entity 830 may be a server that may provide each of nodes 810, 820 . . . N a record or other entity details of an entity and each of nodes 810, 820 . . . N may, independently, use a record received from identifying entity 830 to verify the identity of the entity, associate a confidence or trust level with a copy of the record that may be stored by the node.

For example, a record (or identity record) may include any identity details or attributes as described (e.g., photo, contact information, biometric information, passwords, public-keys, credit history, credit numbers and the like).

Nodes 810, 820 . . . N may use any consensus to establish common or synchronized identity storage and/or combined trust; for example, nodes 810, 820 . . . N may update each other such that obsolete entity details may be removed from all of 810, 820 . . . N. For example, if node 810 learns that a phone number of a user is no longer valid, then node 810 may inform node 820 of such change and node 820 may update its copy of entity details accordingly. Any operation performed by nodes 810, 820 . . . N, target entity 840 and/or identifying entity 830 may be performed, for example, by a dedicated unit in these nodes, e.g., an SEU as described herein. Verifying, updating or synchronizing entity details may be done periodically, e.g., based on a timer, or based on an event, e.g., every time entity details change.

In some embodiments, a method, procedure or sequence of operations may include, or be related to searching for and/or providing records or entity details by a searching entity-engine that may create a record for the entity to be (verified and) stored in the (typically distributed) identity authority. Later, the stored and verified entity record (or field of the record) may be requested, received or read, by a user or a node (e.g., identifying entity 830).

Records or entity details may be obtained from each of nodes 810, 820 . . . N, possibly after gaining authorization from the node or identity holder, e.g., an authorization may be provided by cryptographic approval mechanism or method, e.g., a mechanism or flow involving an OTP as described herein.

A reader, requestor or receiver of an entity's details may establish trust in the identity and its history using a function of the confidence or trust levels in answers or responses received from the responding nodes.

Identity (or entity details) holders (e.g., nodes 810 and 820) may periodically perform search, update or verification for information they hold e.g., to avoid identity theft, and they may (periodically, e.g., daily, monthly) search/read/write/update report on their identity record. For example, nodes 810 and 820 may periodically validate or verify that the entity details they store are valid or correct and may inform each other and/or identifying entity 830 of the validity of entity details they store.

Fees for creating/maintaining a record or entity details may be handled by a server (e.g., identifying entity 830) as a paid to (distribute) identity authority. A server (e.g., identifying entity 830) may facilitate record write, possibly checking the trust in it by further greater means than those described herein.

A server (e.g., identifying entity 830) may check the authorization for search and reads, possibly checking such requests in further greater means. One or more servers (e.g., a plurality of identifying entities 830) may provide or enable worldwide presence and may participate in any interaction while other nodes may only join the quorum.

Some embodiments of the invention may address the challenge of revocation, nullification or cancellation of a computerized account. A user may wish to revoke his computerized account in various circumstances, for example when he is no longer interested to be registered to a server, service or application to which he is enrolled. In some circumstances, however, a user may wish to revoke his computerized account temporarily, get a new password and enroll again, for example, when a device of the user that includes passwords or can otherwise enable access to a computerized account of the user is lost.

As used herein a computerized account may refer to an arrangement by which an entity may use computerized resources, e.g., the Internet, e-mail services, banking services, accessing a server, service or application etc., of a particular organization or infrastructure. A computerized account is typically protected by various means intended to identify and authenticate the user of the computerized account, and to prevent malicious entities or hackers from gaining access to the computerized account. Revocation may be used by a hacker or other malicious entity to register or enroll to the computerized account. For example, the malicious entity may request the service provider to revoke a computerized account and then request the service provider to issue a new password to the same computerized account in order to enroll again. Some service providers request users to answer questions in the process of enrollment, and these questions are asked again if a new password is requested. A new password is provided only if the user provides the correct answers to these questions. These questions typically involve personal information that is assumed to be known to the user only. Even if a new password is provided only after answering questions, the malicious entity may attempt at getting the right answers by, for example, searching for the required information in social networks.

In some embodiments, a revocation process, method or flow may be initiated by the user. For example, the user may initiate revocation by sending a revocation request to an administrator, a server or other enrollment management entity. The revocation process, method or flow may include using one or more other trusted (e.g., already or previously enrolled) entities, devices or users, that are associated with revoked computerized account. For example, after receiving a revocation request, a first value, e.g., a first share described herein, may be sent directly to the user via any applicable communication channel as described herein, for example, via WhatsApp or via e-mail. A second value, e.g., a second share, may be sent to a first trusted user who previously enrolled with the server or service and who was previously associated with the user, a third value, e.g., a third share, may be sent to a second trusted user who previously enrolled with the server or service and who was previously associated with the user, and so on. The associated users may be other employees in an organization, family members, and so on.

Accordingly, in order to revoke a computerized account of a user, an embodiment may send to, or share with the user and other users associated with that user, a set of values or shares that may be used together to generate a key, code, token or value that may, in turn, be used for verifying and revoking the computerized account of the user. One of the associated users may combine the shares, e.g., the shares of the user and the shares of all other associated users, and send the combined code to the administrator, server or enrollment management entity, which may, in turn revoke the computerized account of the user. In some embodiments, a single associated user is used. Thus, one share is sent to the user, and a second share is sent to the associated user, the user or the associated user may combine the shares, e.g., the share of the user and the associated user, and send the combined code to the administrator, server or enrollment management entity, which may, in turn revoke the computerized account.

Returning to FIG. 7, an entity with an active computerized account, e.g., entity 740, may be linked or associated with at least one another trusted entity, e.g., entity 720, for the purpose of revocation. A database or list of associations between entities may be stored or otherwise maintained by, or be accessible to, identifying entity 710. Associated entity 720 may be selected to be associated with entity 740 by entity 740, e.g., as part of an enrolment process, or it may be nominated by identifying entity 710.

In some embodiments, in order to revoke a computerized account of an entity, e.g., to revoke, terminate, or cancel a computerized account of a registered user or device, a first value may be provided to the user, and a second value may be provided to another trusted device or entity that is linked or associated with the user. According to some embodiments, entity 740 may request identifying entity 710 to revoke a computerized account of entity 740. As described, entity 740 may receive values (e.g., generated values 126 or other secret values) from identifying entity 710, and at least one of associated entities 720 and 730 may receive a request to revoke the computerized account of entity 740 and values (e.g., generated values 126 or other secret values) from identifying entity 710.

For example, after receiving a request to revoke the computerized account of entity 740, identifying entity 710 may send a first value (e.g., a generated value 126 or secret value as described herein) to entity 740, and identifying entity 710 may send a second generated value 126 to associated entity 720. The user of entity 740 may provide the first value to trusted entity 720, or trusted entity 720 may provide the second value to entity 740, using any applicable method or communication channel as described herein.

The first and a second values may be used by associated entity 720 or by entity 740 to revoke the computerized account of entity 740. For example, associated entity 720 may use two or more values (provided to entity 720 as described herein) to generate a secret value that may be known to identifying entity 710, and, by providing the secret value to identifying entity 710 (and/or otherwise prove possession of a secret value or a set of values), entity 740 may be identified, authenticated or verified, and its request for revocation of its computerized account may be fulfilled by identifying entity 710. In some embodiments, entity 740 may use the two or more values (provided to entity 740 as described herein) to generate the secret value and to provide the secret value to identifying entity 710.

It will be noted that, although, for the sake of simplicity, only one associated entity is described herein, any number of associated entities may be used for providing any number of values that may be used for revoking a computerized account. For example, to increase any of: security; resilience and/or fault tolerance, three values may be sent, by authentication entity 710 to entity 740 and two other associated entities such as entities 720 and 730. For example, for redundancy, the same value may be sent to two different associated entities on a network such that, if one of the values is lost, revocation may still succeed. In some embodiments, in order to increase redundancy or resilience of a system, a subset of values from a set of values sent may suffice to evocate the entity. For example, identifying entity 710 may send three values to entity 740 and two associated entities, users, devices or entities such as entities 720 and 730, where two of the three values may be enough for identifying entity 740 and revoking its computerized account. For example, two points out of three points on a curve of a polynomial of first degree may suffice to identify the polynomial, or, in another example, entity 740 may be identified based on a concatenation of any two values out of three values.

Communicating values, e.g., between any or identifying entity 710, associated entities 720 and 730 and entity 740, may be done as described herein, e.g., over in-band and/or out-of-band channels, logical and/or physical channels etc. In some embodiments, a channel known to be secured (e.g., WhatsApp) may be used for to send values from identifying entity 710 to entities 740 and 720 and/or from entity 740 to associated entity 720.

Figure 9:
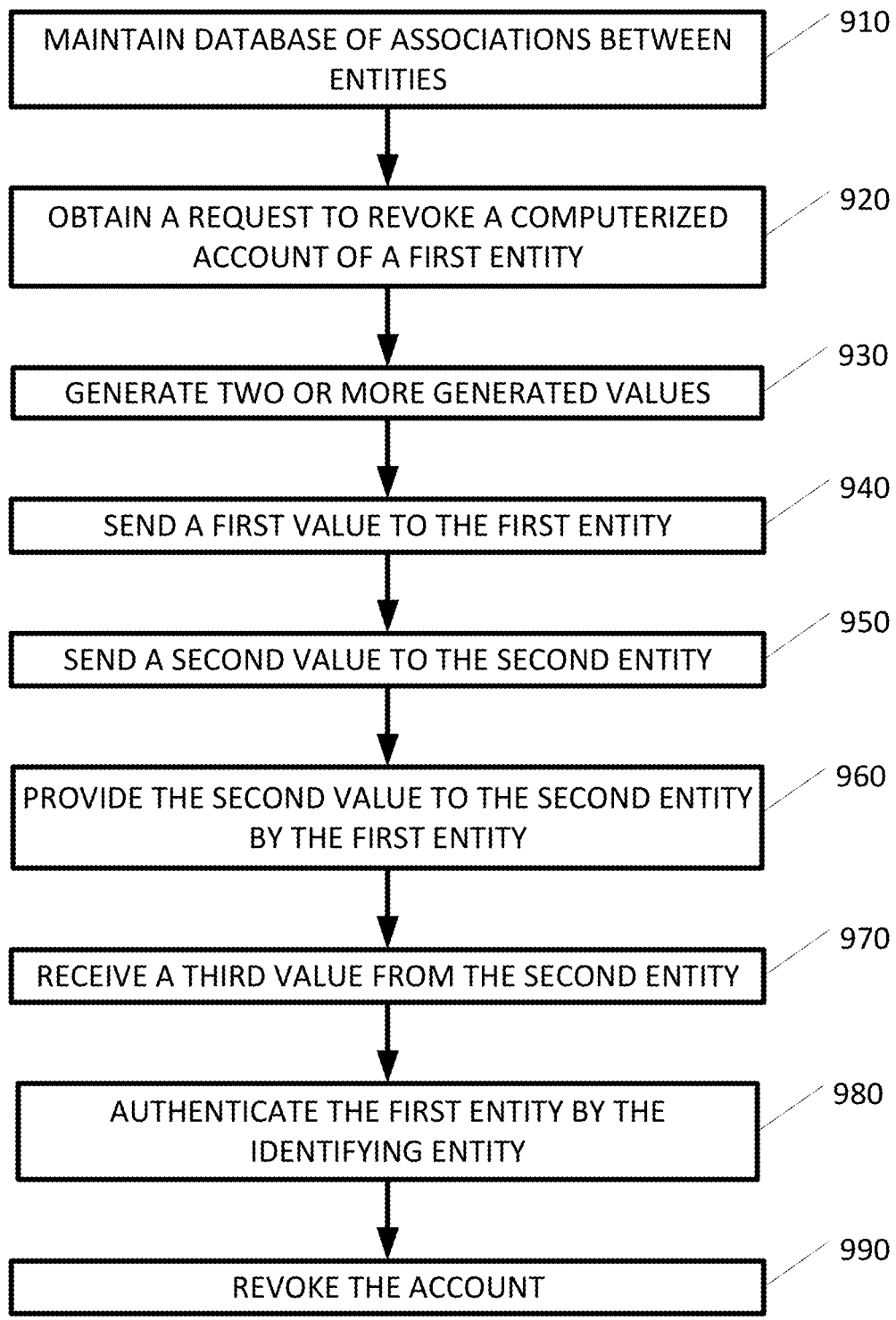
FIG. 9 shows a flowchart of a method of revoking a computerized account of an entity, according to some embodiments of the present invention.

Reference is now made to FIG. 9, which is a flowchart of a method of revoking a computerized account of an entity, according to some embodiments of the present invention. The method presented in FIG. 9 may be performed, for example, by systems 100, 200, 300 and 700 depicted in FIGS. 1, 2, 3 and 7 respectively. As shown by operation 910, a database or a list of associations between entities may be stored or otherwise maintained by, or be accessible by, an identifying entity, e.g., identifying entity 710. As disclosed, associated entities, e.g., associated entity 720, may be selected to be associated with a requesting entity, e.g., entity 740 by entity 740, e.g., as part of an enrolment process, or associated entities may be determined or nominated by identifying entity 710.

As shown by operation 920, a request to revoke a computerized account of a first entity may be sent from the first entity and obtained by the identifying entity. The identifying entity may attempt to authenticate the request by generating two or more generated values, e.g., generated values 126 as disclosed herein, or shares, as shown in operation 930. For example, a first value may include a first pair of input and output values of a polynomial of a first degree, and a second value may include a second pair of input and output values of the polynomial. The first and second pairs may be used by the identifying entity and the second entity to identify the polynomial, and a third value may be generated based on a function applied to at least one coefficient of the polynomial. The first and second values may be encrypted.

In operation 940, a first value may be sent to the first entity, e.g., from the identifying entity. The first value may be sent to the first entity over a first secured communication channel. In some embodiments, the first value may be sent to the first entity over an in-band channel. In operation 950, a second value may be sent to the second entity, e.g., from the identifying entity. The second value may be sent to the second entity over a second secured communication channel. In some embodiments, the first value may be sent to the second entity over an in-band channel. In operation 960, the first entity may provide the first value to the second entity, or the second entity may provide the second value to the first entity. The first or second entity may provide the value to the other entity using an in-band channel or an out-of-band channel. In operation 970, a third value that is based on the first and second values may be received, e.g., by the identifying entity, from the first entity or the second entity. The third value may be generated by the first or second entity by, for example, identifying the polynomial and generating the third value based on a known function applied to at least one coefficient of the polynomial.

In operation 980, the first entity may be authenticated by the identifying entity based on a determination that the first entity or the second entity possesses the first and second values. For example, the identifying entity may determine that the first entity or the second entity possesses the first and second values based on the received third value. For example, by comparing the received third value (e.g., the third value generated and sent by the first or second entity) with a third value generated by the identifying entity. If the received third value and the generated third value are identical, entity 940 may be authenticated, and the computerized account may be revoked, otherwise the request for revocation of the computerized account may be denied and the computerized account may not be revoked. In operation 990, the computerized account may be revoked.

In some embodiments, the degree of the polynomial may be higher than one. For example, a polynomial of degree k may be used. The degree may be selected randomly, e.g., by the identifying entity. A set of at least K+1 pairs of input and output values of the polynomial may be generated, and at least K+1 pairs may be shared over at least two different network routes with the first entity and the second entity, such that no other single entity on the network obtains more than K pairs included in the set of at least K+1 pairs. After constructing the polynomial from the at least K+1 pairs, a function may be applied to any one or more of the coefficients of the polynomial to generate the third value.

The advantage of using associated devices may be readily appreciated as it enables embodiments of the invention to revoke devices using other trusted or authenticated devices. Unlike known systems and methods that revoke computerized accounts only by communicating directly with the revoked entity, using associated entities as described may prevent a hacker from revoking a computerized account just by obtaining requested information about the revoked computerized account.

Some embodiments of the invention may address the challenge of secure password management. In many organizations, an active directory is responsible for assigning and enforcing security policies, including storing a database of usernames and passwords, for all entities in the network. When a user logs in into a server or computer that is part of the domain managed by the active directory, he typically types his username and password. These details are compared with the username and password that are stored in the active directory. Some currently available active directories do not enable generation and distribution of temporary passwords. An enterprise may use OTPs as part of multiple-factors-authentication (MFA), for example, a server may issue an OTP as a second phase of authentication. However, even if the enterprise has MFA, if a malicious entity succeeds to gain access to the active directory, the malicious entity can bypass the MFA and login only with a password that, as noted before, is stored in the active directory. Thus, the active directory itself may, in some circumstances, become a weak and vulnerable point in the security of the organization.

In some embodiments, a password management process, method or flow may include generating a temporary password by an entity (e.g., server or application) separated from the active directory, sending the temporary password to the active directory and to the user, for example, using secret sharing as disclosed herein. The user may then use the temporary password to log in into the active directory. The temporary password may be deleted from the active directory after a predetermined period from its creation and/or after a single login. The temporary password may be cached locally on a local computer so there would be no need to re-log in to the active directory if the local computer is hibernating. With this process, there is no vulnerable database that holds passwords and there is no way to bypass MFA.

Figure 10:
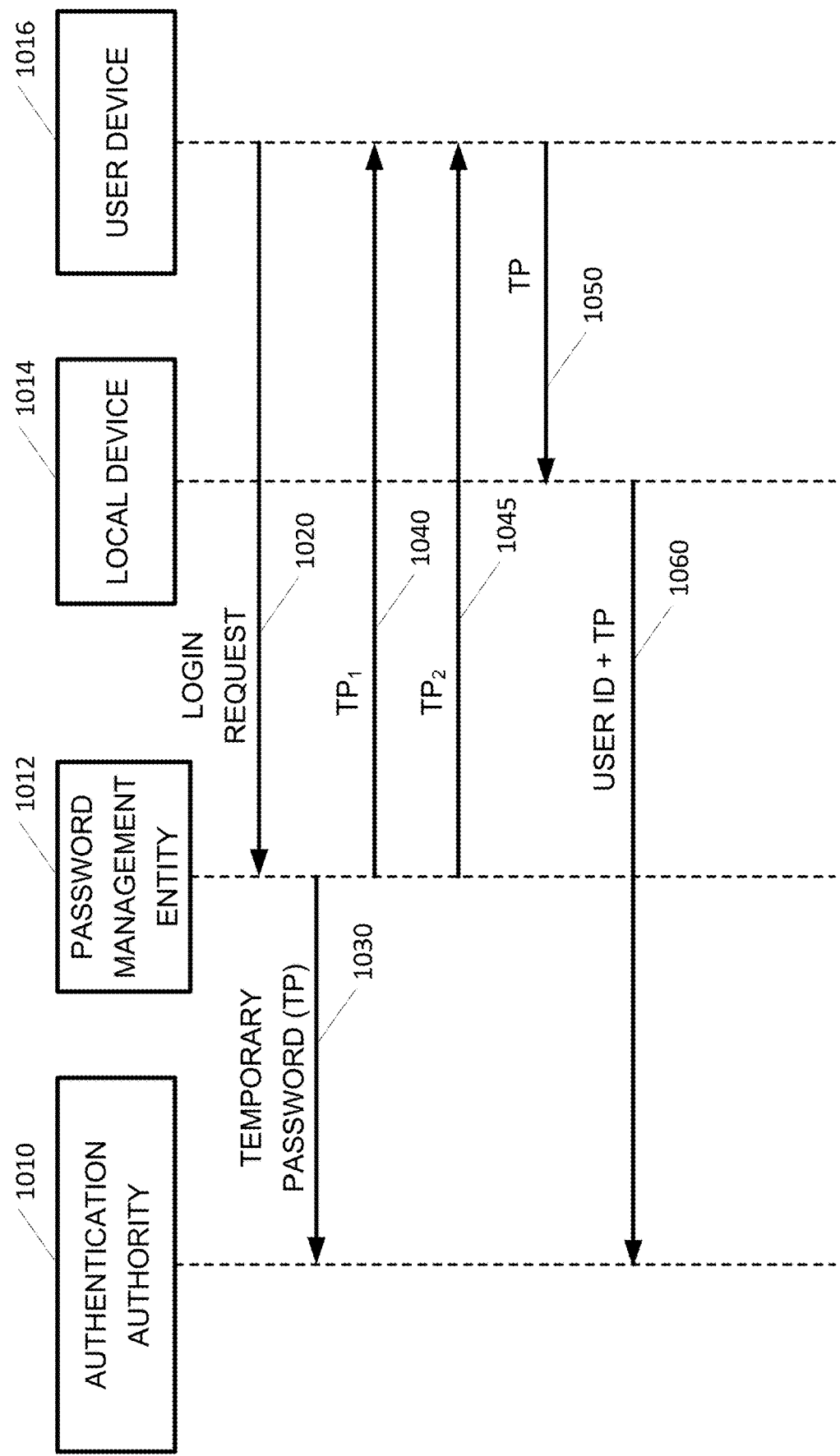
FIG. 10 is a flowchart of a method for password management, according to illustrative embodiments of the present invention.

Reference is made to FIG. 10, which is a flowchart of a method for password management according to illustrative embodiments of the present invention. The method presented in FIG. 10 may be performed, for example, by systems 200 and 300 depicted in FIGS. 2 and 3, respectively. For example, authentication authority 1010 and password management entity 1012 may each be a device similar to server 230. Password management entity 1012 and authentication authority 1010 may be located on two separated servers 230, or may be two applications executing on a single server 230. Local device 1014 and user device 1016 may each be a device similar to computing device 210. In some embodiments, authentication authority 1010 may be an active directory, as known in the art.

When a user tries to log in into authentication authority 1010 through local device 1014, he may first have to request to login through user device 1016. User device 1016 may send a login request to password management entity 1012, as shown by arrow 1020. The login request may identify user device 1016 or the user, for example, by including a user or a device ID. Although not shown, the login request may be sent from local device 1014 to authentication authority 1010, and authentication authority 1010 may forward the request to password management entity 1012. Upon obtaining the login request, password management entity 1012 may generate, or randomly generate, a temporary password (TP).

Password management entity 1012 may send the temporary password to authentication authority 1010, as shown by arrow 1030, and to user device 1016 in multiple channels, as shown by arrows 1040 and 1045. User device 1016 may be a device physically or logically separated from local device 1014, and associated with the user who wishes to login to authentication authority 1010. For example, local device 1014 may be the user's desktop computer or laptop, and user device 1016 may be the user's smartphone. In some embodiments, password management entity 1012 may use secret sharing or any other method to create, based on the generated temporary password, (at least) two new shares, values or codes denoted in FIG. 10 as $TP_1$ and $TP_2$. For example, $TP_1$ and $TP_2$ may be similar to generated values 126 described herein, so that temporary password can be determined based on the values $TP_1$ and $TP_2$.

As shown by arrow 1040, $TP_1$ (one of the shares or values created based on the temporary password) may be sent, over a first communication channel, to user device 1016. For example, $TP_1$ may be sent, from password management entity 1012 to user device 1016 using, or over, a network connection (e.g., an SSL connection) or using a push notification channel scheme or method. It will be understood that other communication channels may be used to send $TP_1$ to user device 1016 as shown by arrow 1040. As shown by arrow 1045, $TP_2$ (the second share created based on the temporary password) may be sent, using a second communication channel, to user device 1016. It is noted that, in some embodiments, the channel, route or link used for sending $TP_2$ is different from the channel, route or link used for sending $TP_1$. For example, to send $TP_1$ and $TP_2$, two different in-band channels may be used, two different out-of-band channels may be used, or one in-band channel and one out-of-band channel may be used such that $TP_1$ is sent over a first channel and $TP_2$ is sent over a second, different channel. User device 1016 may combine $TP_1$ and $TP_2$ to arrive at the TP, as disclosed herein.

As shown by arrow 1050, user device 1016 may provide the temporary password to local device 1014. User device 1016 may provide the temporary password to local device 1014 using in-band or out-of-band channel. For example, a user may type the temporary password provided to user device 1016 into local device 1014, or user device 1016 may transmit the temporary password using any applicable communication channel such as WiFi, Bluetooth etc.

Although not shown, instead of sending the temporary password, password management entity 1012 may send $TP_1$ and $TP_2$ to authentication authority 1010 using two different communication channels, and authentication authority 1010 may combine $TP_1$ and $TP_2$ to arrive at the TP, as disclosed herein. Similarly, password management entity 1012 may send the temporary password to user device as is, without using secret sharing. In addition, password management entity 1012 may send $TP_1$ to local device 1014 and $TP_2$ to user device 1016. In this case, user device 1016 may provide $TP_2$ to local device 1014, and local device 1014 may combine $TP_1$ and $TP_2$ to arrive at the temporary password.

Accordingly, a state where authentication authority 1010 and local device 1014 have the temporary password is achieved. As shown by arrow 1060, a user may log in to authentication authority 1010 using his or her user ID or other credentials and the temporary password. For example, to log in to authentication authority 1010, local device 1014 may send the user ID and temporary password over an SSL communication channel to authentication authority 1010 as shown by arrow 1060. At authentication authority 1010, the temporary password received from local device 1014 and other credentials of the user may be checked, e.g., the temporary password obtained from local device 1014 may be compared with the temporary password obtained from password management entity 1012. If a match is found, the login may be authorized or permitted, and otherwise the login request may be denied. The temporary password may be stored temporarily by authentication authority 1010, for example, until login is permitted or denied and/or for a predetermined time period or whichever happens first). The temporary password may be deleted from authentication authority 1010 after a predetermined period from its creation and/or after a single login or whichever happens first). The temporary password may be cached or stored locally on a local device 1014 so no need to re-login to active directory if the local device 1014 is hibernating.

$TP_1$ and $TP_2$ may be similar to generated values 126, or shares, as disclosed herein. For example, $TP_1$ may include a first pair of input and output values of a polynomial of a first degree, and $TP_2$ may include a second pair of input and output values of the polynomial. The first and second pairs may be used by user device 1016, local device 1014 and/or authentication authority 1010 to identify the polynomial, and the temporary password may be generated based on a function applied to at least one coefficient of the polynomial. $TP_1$, $TP_2$ and/or temporary password may be encrypted. In some embodiments, the degree of the polynomial may be higher than one. For example, a polynomial of degree k may be used. The degree may be selected randomly, e.g., by password management entity 1012. A set of at least K+1 pairs of input and output values of the polynomial may be generated, at least K+1 pairs may be shared over at least two different network routes with user device 1016 (or with user device 1016 and local device 1014, or with authentication authority 1010), such that no other single entity on the network obtains more than K pairs included in the set of at least K+1 pairs. After constructing the polynomial from the at least K+1 pairs, a function may be applied to any one or more of the coefficients of the polynomial to generate TP.

In the description and claims of the present application, each of the verbs, "comprise" "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Some embodiments utilize only some of the features or possible combinations of the features. Variations of embodiments of the invention that are described, and embodiments comprising different combinations of features noted in the described embodiments, will occur to a person having ordinary skill in the art. The scope of the invention is limited only by the claims.

Unless explicitly stated, the method embodiments described herein are not constrained to a particular order in time or chronological sequence. Additionally, some of the described method elements may be skipped, or they may be repeated, during a sequence of operations of a method.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A computer-implemented method of passwords management, the method comprising:
   obtaining, by a password management entity, a request to login a local device into an authentication authority;
   generating, by the password management entity, a temporary password;

generating, by the password management entity, two values, $TP_1$ and $TP_2$, based on the temporary password, wherein the temporary password can be determined based on the values $TP_1$ and $TP_2$;

sending, by the password management entity, the temporary password to the authentication authority;

sending, by the password management entity, the temporary password to a user device by sending the values $TP_1$ and $TP_2$ over multiple channels;

combining, by the user device, the values $TP_1$ and $TP_2$ to arrive at the temporary password;

obtaining, at the local device, the temporary password from the user device;

obtaining, at the authentication authority the temporary password from the local device;

comparing, by the authentication authority, the temporary password obtained from the local device with the temporary password obtained from the password management entity; and authorizing the login if a match is found.

2. The method of claim 1, further comprising:
sending, by the password management entity, $TP_1$ to the user device over a first secured communication channel; and
sending, by the password management entity, $TP_2$ to the user device over a second secured communication channel.

3. The method of claim 1, further comprising:
combining $TP_1$ and $TP_2$ by the user device to arrive at the temporary password; and
sending the temporary password from the user device to the local device using an out-of-band channel.

4. The method of claim 1, further comprising:
sending, by password management entity, $TP_1$ to authentication authority over a first secured communication channel;
sending, by password management entity, $TP_2$ to the authentication authority over a second secured communication channel; and
combining $TP_1$ and $TP_2$ by the authentication authority to arrive at the temporary password.

5. The method of claim 1, further comprising:
deleting the temporary password from the authentication authority after comparing.

6. The method of claim 1, wherein:
$TP_1$ includes a first pair of input and output values of a polynomial of a first degree, and the $TP_2$ includes a second pair of input and output values of the polynomial, and
wherein the method includes:
using the first and second pairs to identify the polynomial; and
generating the temporary password based on a function applied to at least one coefficient of the polynomial.

7. The method of claim 1, further comprising:
generating a set of at least K+1 pairs of input and output values of a polynomial of degree K, wherein $TP_1$ includes a portion of pairs of input and output values of the polynomial, and wherein the $TP_2$ includes the other pairs of input and output values of the polynomial;
using $TP_1$ and $TP_2$ to identify the polynomial; and
after identifying the polynomial from the at least K+1 pairs, applying a function to at least one of the coefficients of the polynomial to generate the temporary password.

8. The method of claim 1, further comprising:
storing the temporary password on the local device.

9. The method of claim 1, further comprising:
sending, by the password management entity, $TP_1$ to the user device over a first in-band communication channel; and
sending, by the password management entity, $TP_2$ to the user device over a second in-band communication channel.

10. A computer-implemented method of passwords management, the method comprising:
obtaining, by a password management entity, a request to login a local device into an authentication authority;
generating, by the password management entity, a temporary password;
generating, by the password management entity, two values, $TP_1$ and $TP_2$, based on the temporary password, wherein the temporary password can be determined based on the values $TP_1$ and $TP_2$;
sending, by the password management entity, $TP_1$ to the user device over a first secured communication channel;
sending, by the password management entity, $TP_2$ to the local device over a second secured communication channel;
sending the $TP_1$ from the user device to the local device using out-of-band channel; and
combining $TP_1$ and $TP_2$ by the local device to arrive at the temporary password;
obtaining, at the authentication authority the temporary password from the local device;
comparing, by the authentication authority, the temporary password obtained from the local device with the temporary password obtained from the password management entity; and
authorizing the login if a match is found.

11. A system for temporary passwords management, the system comprising:
a memory;
a processor configured to:
obtain a request to login a local device into an authentication authority;
generate a temporary password;
generate two values, $TP_1$ and $TP_2$, based on the temporary password, wherein the temporary password can be determined based on the values $TP_1$ and $TP_2$;
send the temporary password to the authentication authority;
send the temporary password to a user device by sending the values $TP_1$ and $TP_2$ over multiple channels;
combine, by the user device, the values $TP_1$ and $TP_2$ to arrive at the temporary password;
obtain the temporary password from the local device, wherein the local device is configured to receive the temporary password from the user device;
compare the temporary password obtained from the local device with the temporary password obtained from the password management entity; and
authorize the login if a match is found.

12. The system of claim 11, wherein the processor is further configured to:
send $TP_1$ to the user device over a first secured communication channel; and
send $TP_2$ to the user device over a second secured communication channel.

13. The system of claim 11, further comprising the user device:
wherein the user device is configured to:
send the temporary password to the local device using an out-of-band channel.

14. The system of claim 11, further comprising the user device, wherein:
$TP_1$ includes a first pair of input and output values of a polynomial of a first degree and $TP_2$ includes a second pair of input and output values of the polynomial, and wherein the user device is configured to:
use the first and second pairs to identify the polynomial; and
generate the temporary password based on a function applied to at least one coefficient of the polynomial.

15. The system of claim 11, further comprising the user device, wherein the processor is further configured to:
generate a set of at least K+1 pairs of input and output values of a polynomial of degree K, wherein $TP_1$ includes a portion of pairs of input and output values of the polynomial, and wherein the $TP_2$ includes the other pairs of input and output values of the polynomial; and
wherein the user device is configured to:
use $TP_1$ and $TP_2$ to identify the polynomial; and
after identifying the polynomial from the at least K+1 pairs, apply a function to at least one of the coefficients of the polynomial to generate the temporary password.

16. The system of claim 11, further comprising the authentication authority:
wherein the processor is further configured to:
send $TP_1$ to the authentication authority over a first secured communication channel;
send $TP_2$ to the authentication authority over a second secured communication channel; and
wherein the authentication authority is configured to:
combine $TP_1$ and $TP_2$ to arrive at the temporary password.

17. The system of claim 11, further comprising the authentication authority, wherein the authentication authority is configured to delete the temporary password from the authentication authority after comparing.

18. The system of claim 11, further comprising the local device, wherein the local device is configured to store the temporary password on the local device.

19. The system of claim 11, wherein the processor is further configured to:
send $TP_1$ to the user device over a first in-band communication channel; and
send $TP_2$ to the user device over a second in-band communication channel.

* * * * *